United States Patent [19]
Ito et al.

[11] Patent Number: 5,754,303
[45] Date of Patent: May 19, 1998

[54] IMAGE FORMING APPARATUS WITH A DIGITAL MODULATOR

[75] Inventors: Yasuo Ito, Inagi; Akira Torisawa, Machida; Eihiro Sakaki, Chofu; Masaki Ohtake, Kawasaki; Fumihiro Ueno, Yokohama, all of Japan

[73] Assignee: Canon Kabushiki Kaisha, Tokyo, Japan

[21] Appl. No.: 669,129

[22] Filed: Jun. 24, 1996

Related U.S. Application Data

[63] Continuation of Ser. No. 340,477, Nov. 14, 1994, abandoned, and Ser. No. 770,243, Oct. 3, 1991, abandoned.

[30] Foreign Application Priority Data

| Oct. 3, 1990 | [JP] | Japan | 2-266869 |
| Feb. 27, 1991 | [JP] | Japan | 3-032633 |
| Mar. 6, 1991 | [JP] | Japan | 3-039949 |

[51] Int. Cl.⁶ .............. H04N 1/40; G01D 9/42
[52] U.S. Cl. .............. 358/298; 358/455; 347/252
[58] Field of Search ............. 358/298, 455, 358/456, 458, 465, 466; 342/252

[56] References Cited

U.S. PATENT DOCUMENTS

| 4,258,394 | 3/1981 | Kennedy | 358/455 |
| 4,384,297 | 5/1983 | Ohara et al. | 346/108 |
| 4,506,301 | 3/1985 | Kingsley et al. | 358/455 |
| 4,626,923 | 12/1986 | Yoshida | 358/455 |
| 4,691,211 | 9/1987 | Brownstein | 346/76 PH |
| 4,800,442 | 1/1989 | Riseman et al. | 358/298 |
| 4,847,695 | 7/1989 | Arai | 358/455 |
| 4,951,159 | 8/1990 | Van Beck | 358/455 |
| 5,029,227 | 7/1991 | Kawamura | 358/455 X |
| 5,109,283 | 4/1992 | Carley | 358/298 |
| 5,191,444 | 3/1993 | Harada et al. | 358/455 |

FOREIGN PATENT DOCUMENTS

| 0080075 | 6/1983 | European Pat. Off. . |
| 0204094 | 12/1986 | European Pat. Off. . |
| 1120115 | 5/1989 | Japan . |

*Primary Examiner*—Eric Frahm
*Attorney, Agent, or Firm*—Fitzpatrick, Cella, Harper & Scinto

[57] ABSTRACT

An image processing apparatus includes a first delay generation circuit, requiring no high-frequency clocks, for obtaining a pixel formation start timing signal from a digital input signal, a second delay generation circuit, requiring no high-frequency clocks, for obtaining a pixel formation end timing signal from the digital input signal, and a unit for obtaining a pixel formation interval signal from the pixel formation start and end timing signals.

20 Claims, 23 Drawing Sheets

IMAGE FORMING APPARATUS WITH A DIGITAL MODULATOR

This application is a continuation of application Ser. No. 08/340,477, filed Nov. 14, 1994, which is a continuation of application Ser. No. 08/770,243, filed Oct. 3, 1991, now both abandoned.

BACKGROUND OF THE INVENTION

The present invention relates to an image formation apparatus and, more particularly, to an image formation apparatus capable of reproducing a high-quality halftone image.

The following typical conventional halftone reproduction methods are available:

(1) A so-called pulse width modulation method is disclosed in U.S. Pat. No. 4,800,442 wherein digital input image data is D/A-converted, and the converted analog signal is compared with a reference triangular wave signal by an analog comparator to control an ON/OFF time of a laser, thereby reproducing a halftone image. In addition, U.S. Pat. No. 4,384,297 discloses a method of causing a digital comparator to determine an ON/OFF timing of a laser.

(2) According to another conventional halftone reproduction method, the resolution of a printer itself is increased to perform dither processing of digital input image data with a clock having a frequency higher than a pixel clock for forming one pixel of the printer, thereby reproducing a halftone image.

In the conventional method (1) using the analog comparator, the offset value of the reference triangular wave signal and the gain of the D/A converter must be adjusted, and adjustment operations are cumbersome, resulting in inconvenience.

In the conventional method (1) using the digital comparator and the conventional method (2), when the number of gray scale levels is to be increased, the frequency of the clock used in the digital comparator or the dither processing is increased to result in an expensive circuit arrangement and limit the operating speed of elements. For these reasons, the number of gray scale levels cannot be increased much. In order to obtain a high-gradation image with a low circuit cost and a low operating speed, the number of lines (resolution) constituting an image must be reduced. If the frequency for forming one pixel is 5 MHz and the gray scale count is 256, dither processing must be performed at a period of about 78 psec (picoseconds). For this reason, this processing cannot be realized even if general-purpose ECL (Emitter-Coupled Logic) elements are used.

SUMMARY OF THE INVENTION

It is an object of the present invention to provide an image formation apparatus which eliminates the conventional drawbacks described above.

According to an aspect of the present invention, there is provided an image formation apparatus comprising pixel dividing means for dividing one pixel into a plurality of blocks, and means for generating start and end timing signals for causing the pixel dividing means to perform pixel formation, wherein an image formation time is controlled without performing offset control and gain control which are unique to an analog circuit, thereby expressing a halftone image.

According to another aspect of the present invention, there is provided an image formation apparatus comprising pixel dividing means for dividing one pixel into a plurality of blocks, timing signal generating means for generating a pixel start timing signal on the basis of a pixel division timing signal generated by the pixel dividing means, pixel end timing signal generating means for generating a pixel end timing signal, first delay means for generating a delay timing signal of a predetermined time on the basis of the pixel start timing signal, second delay means for generating a delay timing signal of a predetermined time on the basis of the pixel end timing signal, and pixel forming means for defining as a pixel signal an interval between the delay timing signal from the first delay means and the delay timing signal from the second delay means.

With the above arrangement, a halftone image can be reproduced at a low operating frequency without any special adjustment operation and without reducing the resolution.

According to still another aspect of the present invention, there is provided an image formation apparatus for modulating an exposure time of one pixel to express a halftone image, comprising timing signal generating means for generating a pixel formation start timing signal, delay generating means for generating a pixel end timing signal upon a lapse of a predetermined period of time from the pixel formation start timing signal generated by the timing signal generating means on the basis of set gray scale data, and pixel forming means for defining as the exposure time of one pixel a time interval between the pixel formation start timing signal from the timing signal generating means and the pixel end timing signal from the delay generating means.

The above object and other objects, features, and advantages of the present invention will be apparent from the following detailed description of the preferred embodiments in conjunction with the accompanying drawings.

DETAILED DESCRIPTION OF THE PREFERRED EMBODIMENTS

<Description of Schematic Arrangement of Image Formation Apparatus>

Figure 1:
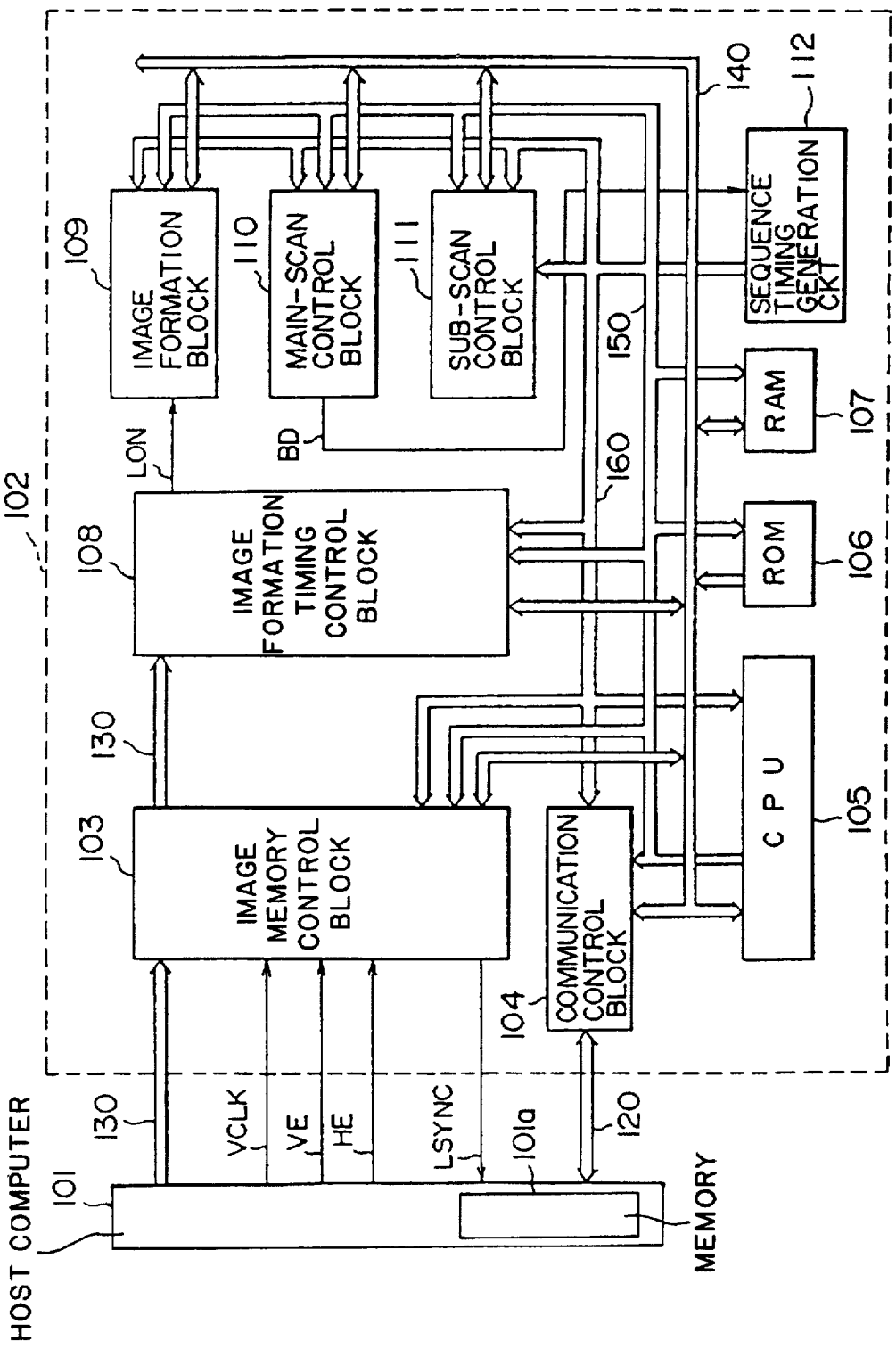
FIG. 1 is a block diagram showing a schematic arrangement of an image processing apparatus according to an embodiment of the present invention.

FIG. 1 is a block diagram showing a schematic arrangement according to an embodiment of the present invention.

Referring to FIG. 1, a host computer 101 controls an image formation apparatus 102. For example, digital image data read by an image scanner is temporarily stored in a memory 101a in the host computer 101 and is subjected to image processing such as "window" processing and "move" processing. The processed data is transmitted to the image formation apparatus 102.

An image memory control block 103 temporarily stores the digital image data transmitted from the host computer 101. In this embodiment of the image formation apparatus, the image memory control block 103 has a double line buffer arrangement and performs one-main-scan synchronization during image transfer between the host computer 101 and the image formation apparatus 102. An operation timing of image transfer is shown in FIG. 2.

Figure 2:
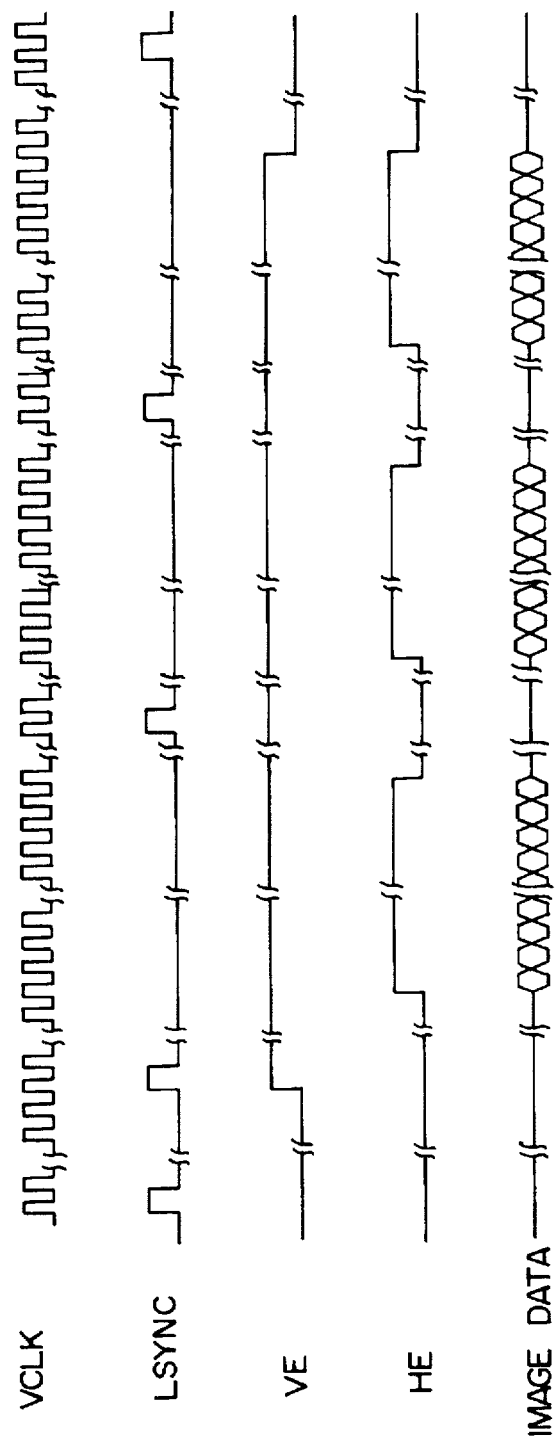
FIG. 2 is a timing chart showing operating timings of image transfer between a host computer and an image formation apparatus.

Referring to FIGS. 1 and 2, an image transfer clock VCLK is used to transmit image data from the host computer 101 to the image formation apparatus 102. A sub-scan sync signal LSYNC is used in the image formation apparatus 102. A vertical image valid signal VE represents a valid area of a one-page image. A horizontal image valid signal HE represents an image valid area of one main-scan cycle. A communication line 120 is used to transmit commands from the host computer 101 to the image formation apparatus 102 and status signals from the image formation apparatus 102 to the host computer 101. A communication control block 104 is used to cause the host computer 101 to communicate with the image formation apparatus 102. Image data is transmitted through a transmission line 130.

Referring to FIG. 1, a CPU 105 performs a series of control sequences of the image formation apparatus 102. A ROM 106 stores programs for executing the control sequences. A working RAM 107 is required to execute the control sequences.

An image formation timing control block 108 will be described in detail later. An image formation block 109 controls a laser light source, a laser driver, a photosensitive drum, a transfer drum, and the like, all of which are associated with an electrophotographic process. A main-scan control block 110 generates a control signal for a polygonal scanner for performing laser scanning, and a BD (Beam Detect) signal representing one main-scan cycle start. A sub-scan control block 111 controls paper feed and rotation of the photosensitive drum, the transfer drum, and the like.

A sequence timing signal generation circuit 112 generates timing signals for the series of control sequences of the image formation apparatus 102. The image formation apparatus 102 also includes a data bus 140, an address bus 150, and timing signal lines 160.

<First Embodiment of Image Formation Timing Control Block>

(1) (Arrangement)

Figure 3:
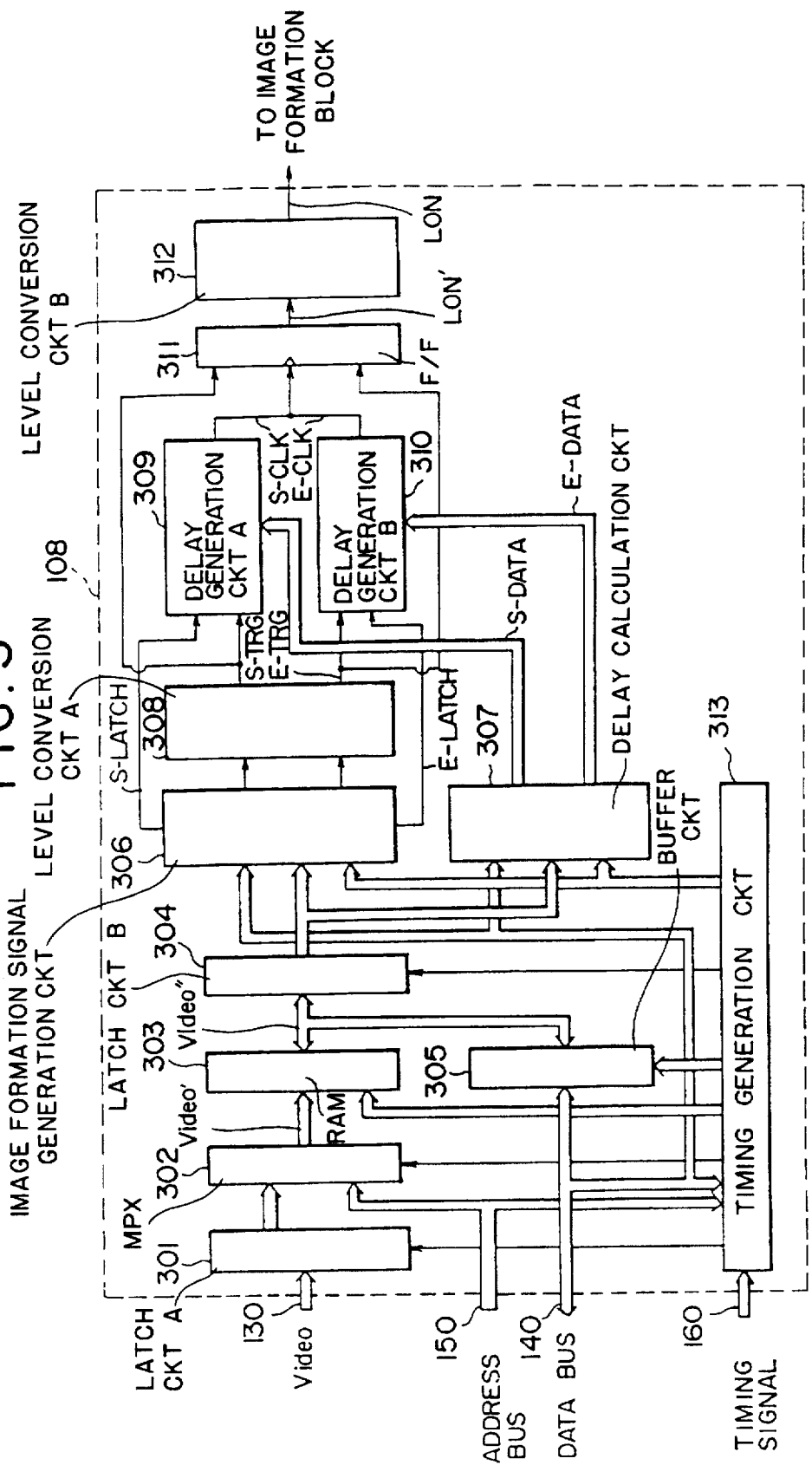
FIG. 3 is a block diagram showing a detailed arrangement of the first embodiment of an image formation timing control block.

FIG. 3 is a block diagram showing an arrangement of the image formation timing control block 108 in the image formation apparatus 102.

The image formation timing control block 108 includes a latch circuit A 301 (an output from the latch circuit A is "Video'"), a multiplexer (MPX) 302, a RAM 303, a latch circuit B 304 (an output from the latch circuit B is "Video""), and a buffer circuit 305. The latch circuit A 301 latches image data (Video) transmitted from the image memory control block 103. The RAM 303 stores a table for performing γ conversion for matching γ characteristics of the input image data with output characteristics of a printer. The multiplexer 302 switches address information applied to the RAM 303 when the CPU 105 sets γ conversion data in the RAM 303 and when γ conversion data is selected in accordance with the value of the signal Video' during image formation. The buffer circuit 305 electrically connects or disconnects the data bus 140 of the CPU 105 to or from the input/output bus of the RAM 303. The latch circuit B 304 latches data output from the γ conversion RAM 303 during image formation.

The image formation timing control block 108 also includes an image formation timing signal generation circuit 306, a delay amount calculation circuit 307, and a level conversion circuit A 308. The image formation timing signal generation circuit 306 receives the signal Video" and generates timing signals for dividing a formation period of one pixel into a plurality of blocks in accordance with the densities to perform image formation on the basis of the value of the signal Video". The delay amount calculation circuit 307 calculates a delay time amount corresponding to the signal Video" on the basis of the pixel division timing signals generated by the image formation timing signal generation circuit 306. The level conversion circuit A 308 converts a TTL-level electrical signal as an output of the image formation timing signal generation circuit 306 into an ECL-level electrical signal.

The image formation timing control block 108 further includes a delay generation circuit A 309, a delay generation circuit B 310, a flip-flop 311, a level conversion circuit B 312, and a timing generation circuit 313. The delay generation circuit A 309 and the delay generation circuit B 310 receive a start trigger signal S-TRG and an end trigger signal E-TRG as outputs from the level conversion circuit A 308, perform delay operations by a predetermined delay time set by the delay amount calculation circuit 307, and generate pulse signals S-CLK and E-CLK, respectively. In this embodiment of the image formation apparatus, each delay generation circuit comprises a digital programmable delay generator such as an AD9500. The AD9500 includes a D/A converter for converting input data into an analog signal and a ramp generator for generating a ramp signal synchronized with a trigger signal. The level of the ramp signal is compared with that of the D/A-converted analog signal to generate a timing signal in accordance with an input data level. When this delay generator is used, a clock having a frequency higher than a sampling frequency need not be used.

The flip-flop (the pulse signals S-CLK and E-CLK are wired-OR) 311 receives the signals S-TRG, E-TRG, S-CLK, and E-CLK to generate a signal having a predetermined pulse width. The level conversion circuit B 312 converts an ECL-level output from the flip-flop 311 into a TTL-level signal.

The timing generation circuit 313 generates operation timing signals for the image formation timing control block 108.

(2) (Description of Operation of Image Formation Timing Control Block)

An operation of the image formation timing control block 108 will be described with reference to FIGS. 3, 4, 5, and 6.

Figure 4:
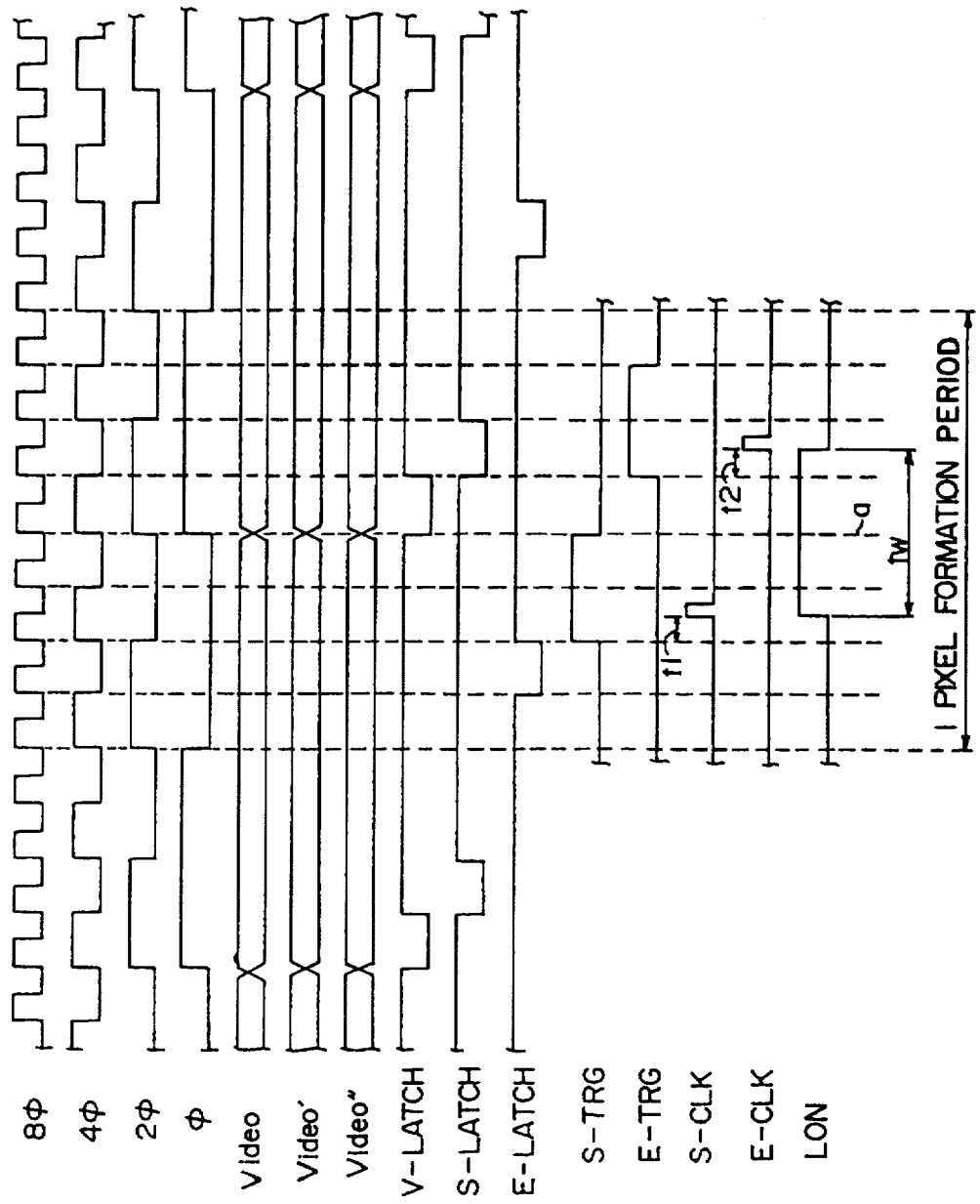
FIG. 4 is a timing chart showing an operation of the image formation timing control block shown in FIG. 3.
Figure 5:
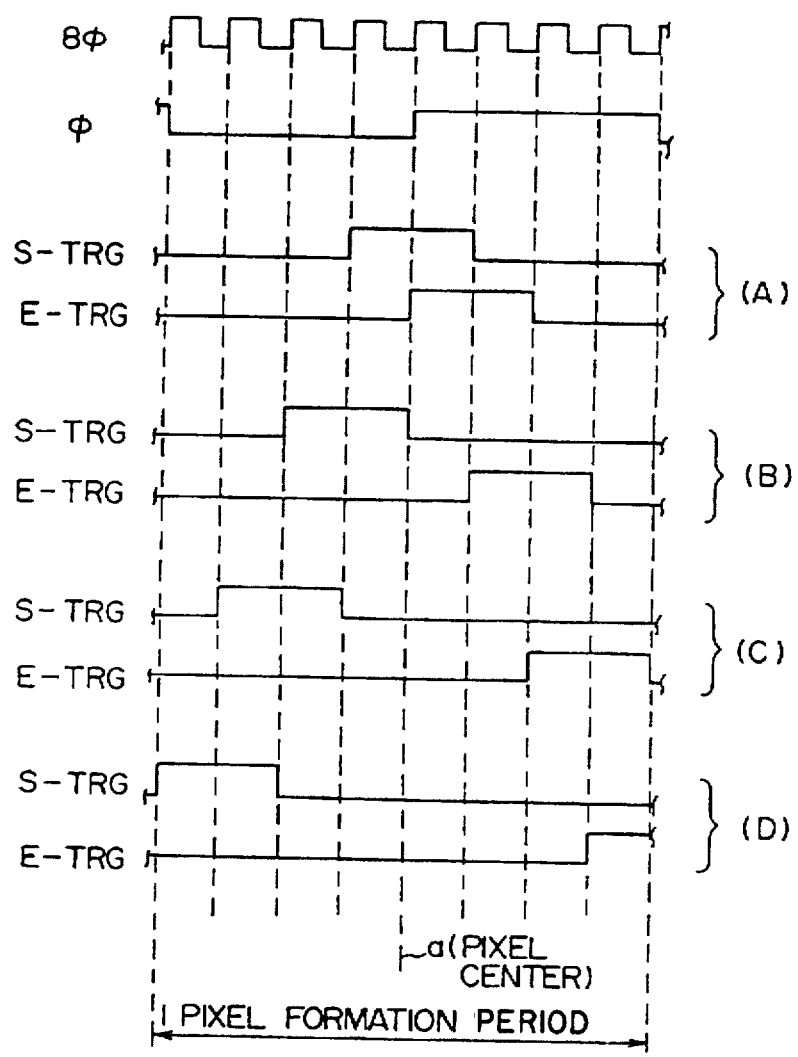
FIG. 5 is a timing chart showing image formation timing signals corresponding to input image data values.
Figure 6:
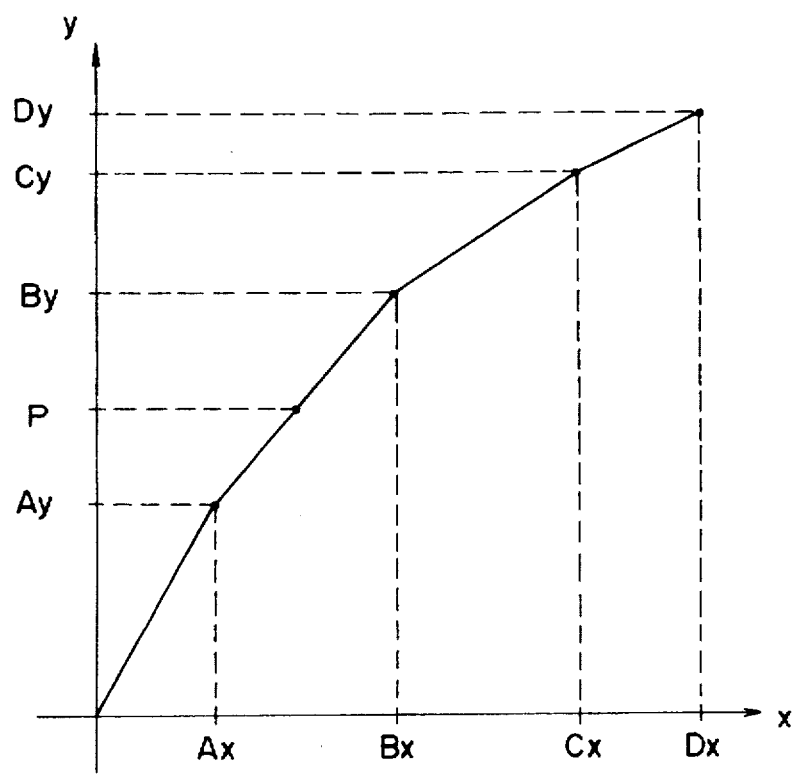
FIG. 6 is a graph showing γ conversion.

FIG. 4 is a timing chart showing an operation of the image formation timing control block 108. FIG. 5 is a timing chart showing output timings of the signals S-TRG and E-TRG obtained by level-converting an output signal from the image formation timing signal generation circuit 306 in response to a digital input image by means of the level conversion circuit A 308. FIG. 6 is a graph showing γ conversion.

Referring to FIG. 6, an axis x of abscissa represents digital input image data (i.e., Video' in FIGS. 3 and 4), and an axis y of ordinate represents γ-converted digital image data (i.e., Video" in FIGS. 3 and 4). Signals Video' having values of 0 to Ax, Ax to Bx, Bx to Cx, and Cx to Dx are γ-converted into signals Video" having values of 0 to Ay, Ay to By, By to Cy, and Cy to Dy by the RAM 303 in FIG. 3, respectively. Note that the contents of the RAM 303 can be set by the CPU 105, and the γ conversion table can be easily updated.

Referring to FIG. 5, a clock signal φ is used to form one pixel. A clock signal 8φ is used to divide one pixel into eight equal portions using a center a of the pixel formation as a reference. The clock signal 8φ has a frequency eight times that of the clock signal φ. (A), (B), (C), and (D) show output timings of the signals S-TRG and E-TRG upon level conversion by means of the image formation timing signal generation circuit 306 in accordance with the values of the signal Video":

(A) when Video" is 0 to Ay;
(B) when Video" is Ay to By;
(C) when Video" is By to Cy; and
(D) when Video" is Cy to Dy.

An image formation operation will be described with reference to mainly FIG. 4.

The digital image data Video sent from the image memory control block 103 is latched by the latch circuit A 301 at a leading edge of the clock signal φ, and the signal Video' is input to the RAM 303 as an address input. At this time, the MPX 302 selects an output from the latch circuit A 301. The RAM 303 receives the signal Video' and outputs γ-converted data. This γ-converted data is latched (Video") by the latch circuit B 304 at a leading edge of the clock signal φ. The image formation timing signal generation circuit 306 receives the signal Video" at a leading edge of a signal V-LATCH and generates the signals S-TRG and E-TRG at one of the timings (A), (B), (C), and (D) in FIG. 5 in accordance with the value of the signal Video" (in the operation of FIG. 4, the timing is (B)). The delay amount calculation circuit 307 receives the signal Video" at the leading edge of the signal V-LATCH and calculates delay time amounts S-DATA and E-DATA from the signals S-TRG and E-TRG generated by the image formation timing signal generation circuit 306 in accordance with the value of the signal Video" (in the case of FIG. 4, these delay time amounts are t1 and t2). The values corresponding to t1 and t2, i.e., S-DATA and E-DATA, are input to the delay generation circuit A 309 and the delay generation circuit B 310 in accordance with the signals S-LATCH and E-LATCH output from the image formation timing signal generation circuit 306. Note that the signals S-LATCH, E-LATCH, S-DATA, and E-DATA are TTL-level signals, and the signals S-TRG and E-TRG are ECL-level signals.

The delay amount calculation circuit 307 comprises, e.g., a RAM, and its delay time amount may be obtained by table conversion processing and set by the CPU 105. Alternatively, the RAM 303 may have a table conversion processing function, and a value corresponding to t1 or t2 is output from the RAM 303 by utilizing condition t1+t2=t (where t is a period of a divided block). The readout value is supplied to the delay amount calculation circuit 307, and the other value may be calculated.

The delay generation circuit A 309 and the delay generation circuit B 310 start counting in response to the signals S-TRG and E-TRG as trigger signals, and generate pulse signals S-CLK and E-CLK upon counting of the times t1 and t2, respectively.

The flip-flop 311 receives the signals S-TRG, E-TRG, S-CLK, and E-CLK and generates a signal LON having a time width tw in FIG. 4 (i.e., a density signal corresponding to a point P in FIG. 6). The signal LON is converted from the ECL level to the TTL level (LON signal), and the TTL-level signal LON drives a laser driver (not shown), thereby controlling the density of an image formed during an ON period of the laser driver.

As described above, according to this embodiment, by using the digital programmable delay generator (AD9500 in this embodiment), the following effects are obtained:

(1) the ON/OFF time of the laser can be controlled to express a halftone image without controlling the offset and gain which are unique to an analog circuit;

(2) a halftone image can be expressed without greatly increasing an operating frequency of the circuit and greatly decreasing the number of reproducible lines (resolution); and (3) since γ-conversion processing is variable, density correction of the image formation apparatus can be controlled by the host computer.

In addition to the above effects, as concomitant effects:

(4) since one pixel is roughly divided into large blocks, and each block is further divided into small portions in order to form one pixel, the number of gray scale levels can be easily increased; and (5) a desired density region can be precisely reproduced in accordance with the arrangement in effect (4) described above.

<Second Embodiment of Image Formation Timing Control Block>

(1) (Arrangement)

Figure 13:
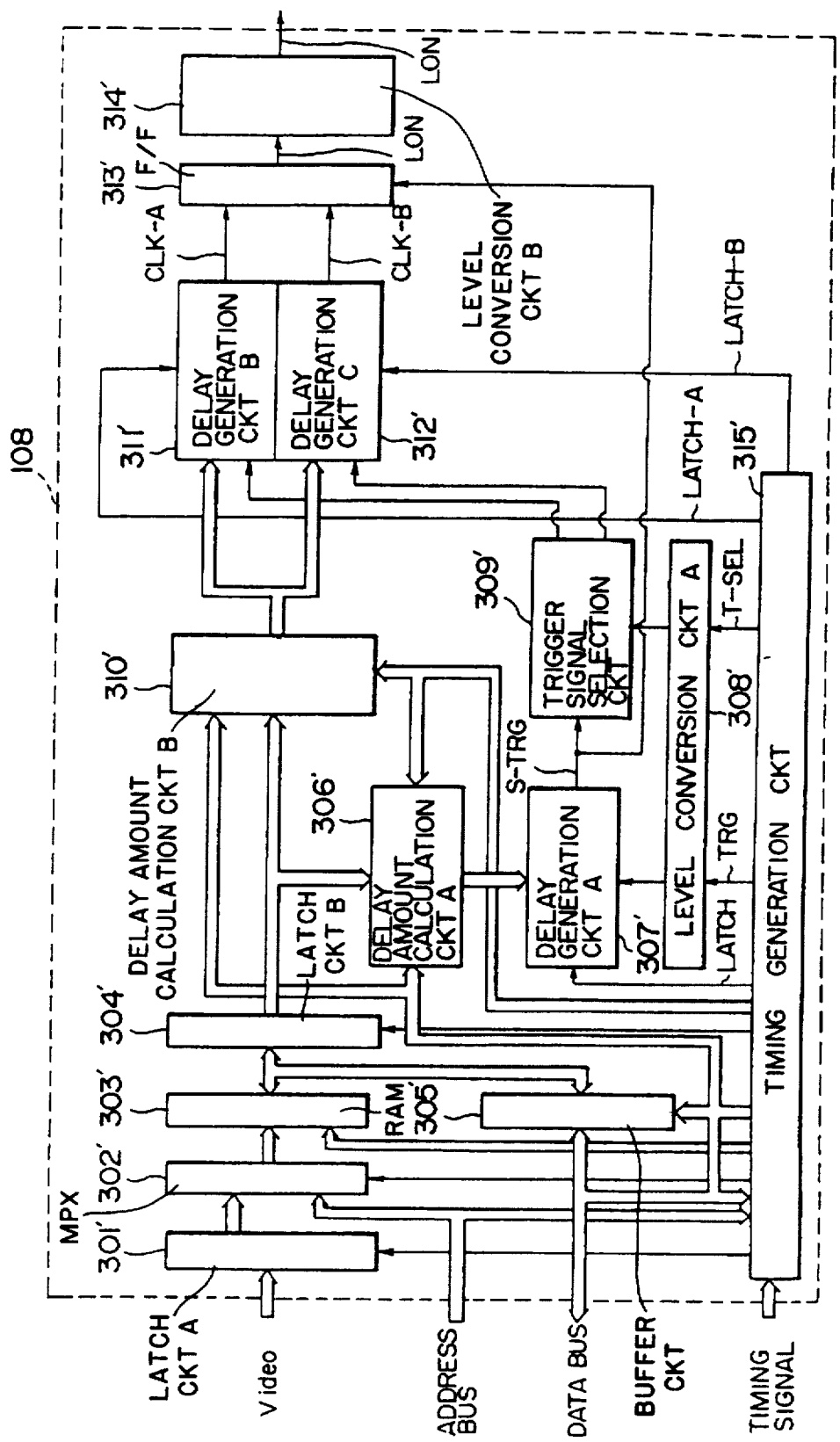
FIG. 13 is a block diagram showing the second embodiment of the image formation timing control block.

FIG. 13 is a block diagram showing the second embodiment of an image formation timing control block 108 in an image formation apparatus 102.

Referring to FIG. 13, components 301' to 305' have the same functions as those of the components 301 to 305. More specifically, the image formation timing control block 108 includes a latch circuit A 301' (an output from the latch circuit A is "Video'"), a multiplexer (MPX) 302', a RAM 303', a latch circuit B 304' (an output from the latch circuit B is "Video""), and a buffer circuit 305'. The latch circuit A 301' latches image data (Video) transmitted from the image memory control block 103. The RAM 303' stores a table for performing γ conversion shown in FIG. 6. The multiplexer 302' switches address information applied to the RAM 303' when the CPU 105 sets γ conversion data in the RAM 303' and when γ conversion data is selected in accordance with the value of the signal Video' during image formation. The buffer circuit 305' electrically connects or disconnects the data bus 140 of the CPU 105 to or from the input/output bus of the RAM 303'. The latch circuit B 304' latches data output from the γ conversion RAM 303' during image formation.

The image formation timing control block 108 also includes a delay amount calculation circuit A 306', a delay generation circuit A 307', a level conversion circuit A 308', a trigger signal selection circuit 309', a delay generation circuit B 311', and a delay generation circuit C 312'. The delay amount calculation circuit A 306' receives the signal Video" and calculates a delay time amount corresponding to a target density for a time interval from generation of a signal TRG representing the start of a one-pixel formation period to generation of a pixel start trigger signal S-TRG representing the start of pixel formation, on the basis of the value of the signal Video". The delay generation circuit A 307' receives an output from the delay amount calculation circuit A 306', delays by a time from the signal TRG in correspondence with a predetermined density, and generates a signal S-TRG. The level conversion circuit A 308' converts a TTL-level signal into an ECL-level signal. The trigger signal selection circuit 309' receives the signal S-TRG to select to which one of the delay generation circuit B 311' and the delay generation circuit C 312' a trigger signal is to be supplied.

The image formation timing control block 108 further includes a delay amount calculation circuit B 310', a flip-flop 313', a level conversion circuit B 314', and a timing generation circuit 315'. The delay amount calculation circuit B 310' calculates a delay time amount corresponding to a target density from generation of the signal S-TRG to generation of a clock CLK-A or CLK-B representing the end of pixel formation. The delay generation circuit B 311' and the delay generation circuit C 312' receive an output from the delay amount calculation circuit B, perform delay operations from the signal S-TRG in accordance with a predetermined density, and generate the clock CLK-A or CLK-B. The flip-flop 313' receives the signals S-TRG, CLK-A, and CLK-B and generates a pixel signal having a pulse width corresponding to the predetermined density. The level conversion circuit B 314' converts the ECL-level signal into the TTL-level signal.

The timing generation circuit 315' generates operation timings of the image formation timing control block 108.

(2) (Description of Operation of Image Formation Timing Control Block)

An operation of the image formation timing control block 108 will be described with reference to FIGS. 13, 14, and 15.

Figure 14:
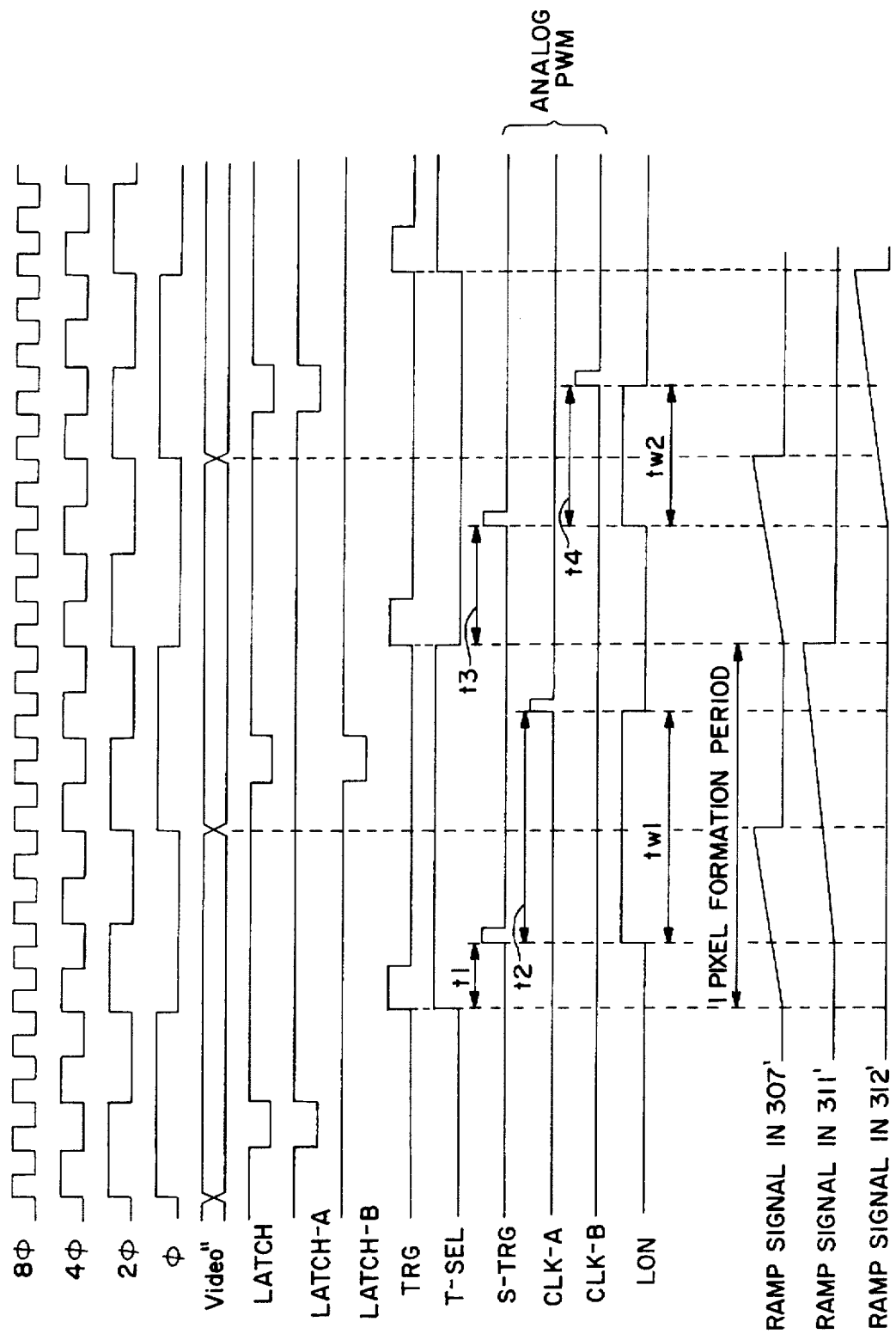
FIG. 14 is a timing chart showing an operation of the image formation timing control block shown in FIG. 13.
Figure 15:
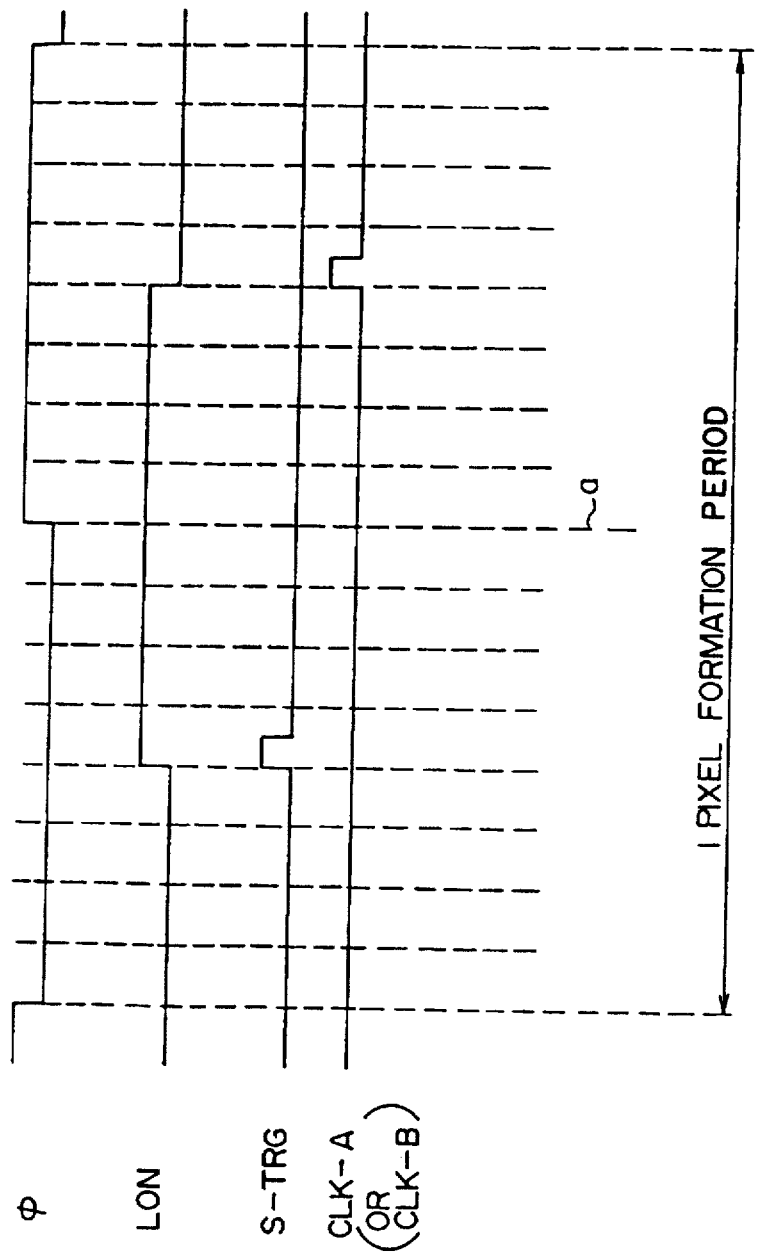
FIG. 15 is a timing chart for explaining an operation for causing a second delay generating means to operate at a speed twice that of a first delay generating means.

FIG. 14 is a timing chart showing an operation of the image formation timing control block 108, and FIG. 15 is a view for explaining an operation for causing a second delay generating means to operate at a speed twice that of a first delay generating means.

The digital image data Video transmitted from an image memory control block 103 is latched by the latch circuit A 301' at a leading edge of a clock φ for forming one pixel. A signal Video' is supplied to the RAM 303 as an address input (in this case, the MPX 302' selects an output from the latch circuit A). The RAM 303' receives the signal Video' and outputs γ-converted data. This γ-converted data is latched (Video") by the latch circuit B 304' at a leading edge of the clock signal φ.

The delay amount calculation circuit A 306' receives the signal Video" and calculates a delay time amount corresponding to t1 (or t3) in FIG. 14. The calculated delay time amount is input to the delay generation circuit A 307'. The delay generation circuit A 307' latches an output from the delay amount calculation circuit A 306' in accordance with a signal LATCH in FIG. 14 and then receives a signal TRG synchronized with the clock signal φ for forming one pixel. The delay generation circuit A 307' generates a signal S-TRG upon a lapse of the time t1 (or t3) in FIG. 14. Note that the signals LATCH and the output from the delay generation circuit A 307' may be TTL-level signals, respectively.

The delay amount calculation circuit B 310' receives the signal Video", calculates a delay time amount corresponding to t2 (or t4) shown in FIG. 14, and supplies it to the delay generation circuits B311' and C312'. The delay generation circuit B 311' latches an output signal (i.e., a value corresponding to t2) at a timing of a signal LATCH-A in FIG. 14. The delay generation circuit C312' latches an output signal (i.e., a value corresponding to t4) from the delay amount calculation circuit B 310' at a timing of a signal LATCH-B in FIG. 14. Note that the signals LATCH-A and LATCH-B and the output signal from the delay amount calculation circuit B 310' may be TTL-level signals, respectively.

Signals S-TRG are supplied to the delay generation circuits B 311' and C 312' by the trigger signal selection circuit 309' every other pixel in response to a signal T-SEL synchronized with a signal TRG. When predetermined times t1 and t3 from the signals S-TRG elapse, the delay generation circuits B 311' and C 312' generate signals CLK-A and CLK-B, respectively.

As shown in FIG. 15, assume that one period of the one-pixel formation period clock φ is divided into 16 blocks to perform a density expression, and that a pulse signal having a pulse width of 4 blocks with respect to a center a of the pixel is generated, the signals S-TRG and CLK-A (or CLK-B) are generated at the fourth block from the center a of the pixel. When the signal S-TRG is, however, used as a reference, the signal CLK-A (or CLK-B) must be generated at the eighth block from the signal S-TRG. That is, the delay generation circuits A 307', B 311', and C 312' have the same delay step division count because they use the same type of components. The delay generation circuits B 311' and C 312' are operated at a speed twice that of the delay generation circuit A 307' (i.e., a delay time amount per step is doubled). A pulse width can be generated for an object with reference to the center a of the pixel.

The flip-flop 313' receives the signals S-TRG, CLK-A, and CLK-B and generates a signal LON' having a predetermined pulse width (tw1 or tw2) corresponding to a predetermined density, as shown in FIG. 14. The signal LON' is converted from an ECL level to a TTL level (signal LON) by the level conversion circuit B 314' and drives a laser driver (not shown), so that the density of an image to be formed is controlled by a laser driver drive time.

As described above, according to this embodiment, by using a digital programmable delay generator (AD9500 in this embodiment) without using a high-frequency clock, it is possible to (1) control an ON/OFF time of a laser without controlling the offset and gain values unique to an analog circuit so as to express a halftone image and (2) express a halftone image without greatly increasing an operating frequency of the circuit and greatly decreasing the number of lines to be reproduced (i.e., a resolution).

In addition, it is possible to (3) cause the host computer to perform density correction of the image formation apparatus because γ conversion processing is variable.

[Another Embodiment]

FIGS. 7 to 12 and FIG. 16 show another embodiment of the image formation apparatus.

Figure 7:
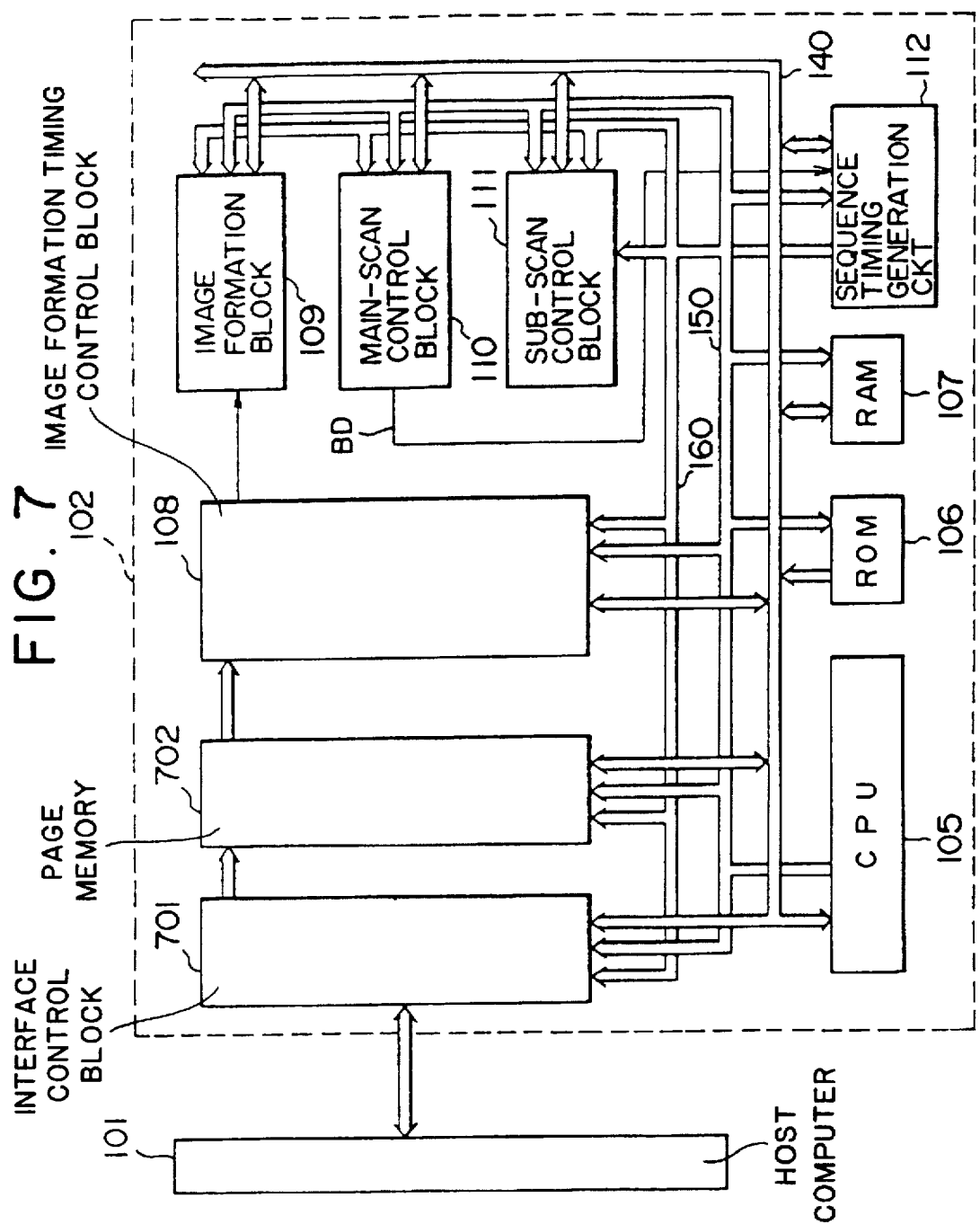
FIGS. 7 to 12 show another embodiment of the present invention.

(1) Referring to FIG. 7, a general interface control block 701 comprises, e.g., an SCSI, an RS232C or a bidirectional Centronic interface. A page memory 702 stores multivalue image data of one page. Other arrangements are the same as those in the embodiments of FIGS. 1 or 2.

That is, in the interfaces described with reference to the first and second embodiments, although an image data transmission rate must be higher than an image formation rate of the image formation apparatus 102, an arrangement in FIG. 7 allows connection between the image formation apparatus 102 and a host computer 101 having a lower data transmission rate.

Figure 8:
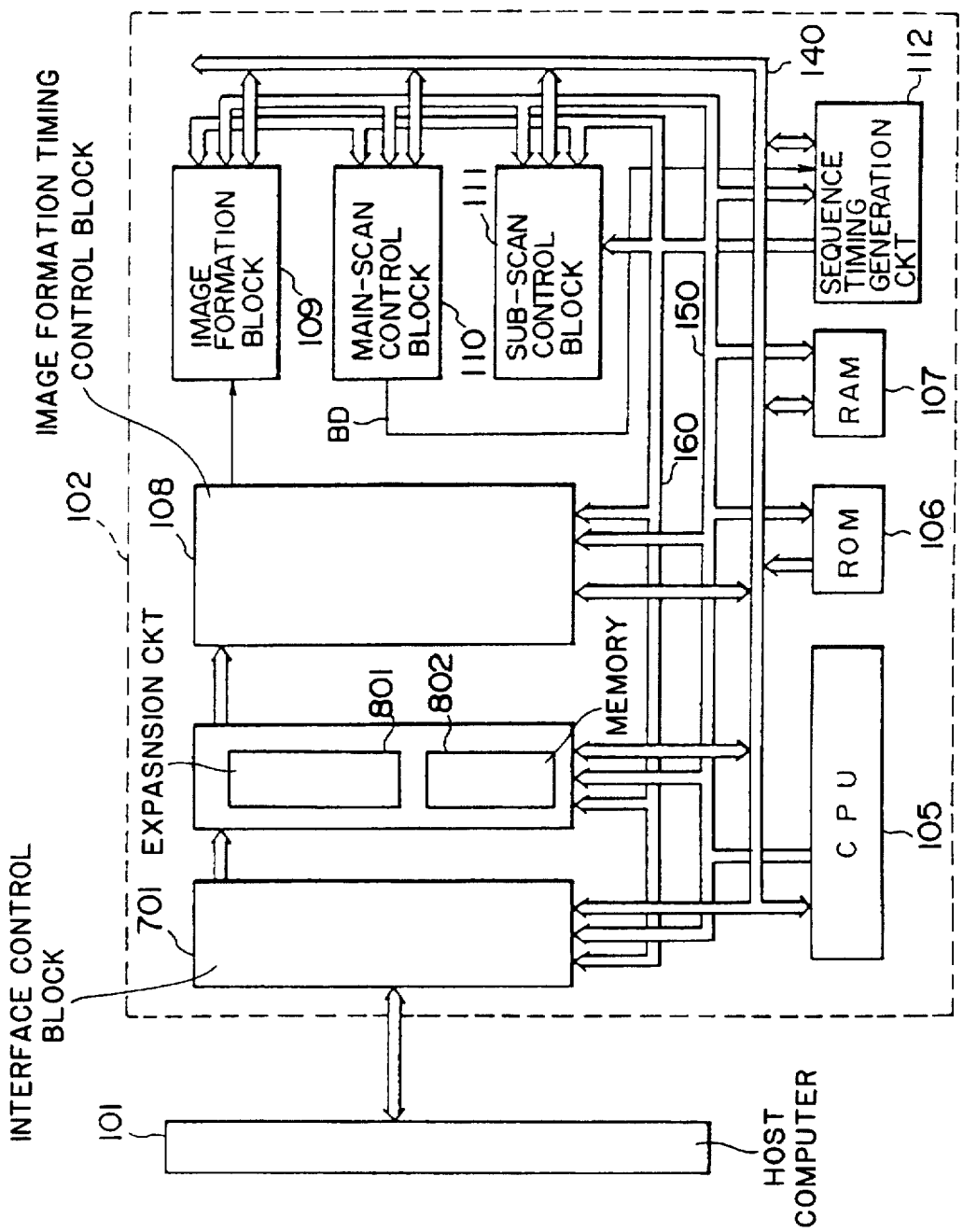

(2) An arrangement shown in FIG. 8 includes an expansion circuit 801 and a memory 802.

In the arrangement of the embodiment of FIG. 7, a data transmission time between the host computer 101 and the image formation apparatus 102 is long, multivalue image data is compressed by the host computer 101 beforehand, and the compressed data is transmitted to the image formation apparatus 102, thereby shortening the data transmission time.

The image formation apparatus 102 receives the compressed data, and the compressed data is expanded by the expansion circuit 801. The expanded data is temporarily stored in the memory 802.

The memory 802 comprises a line buffer memory or a page memory in accordance with an expansion rate of the expansion circuit 801.

Figure 9:
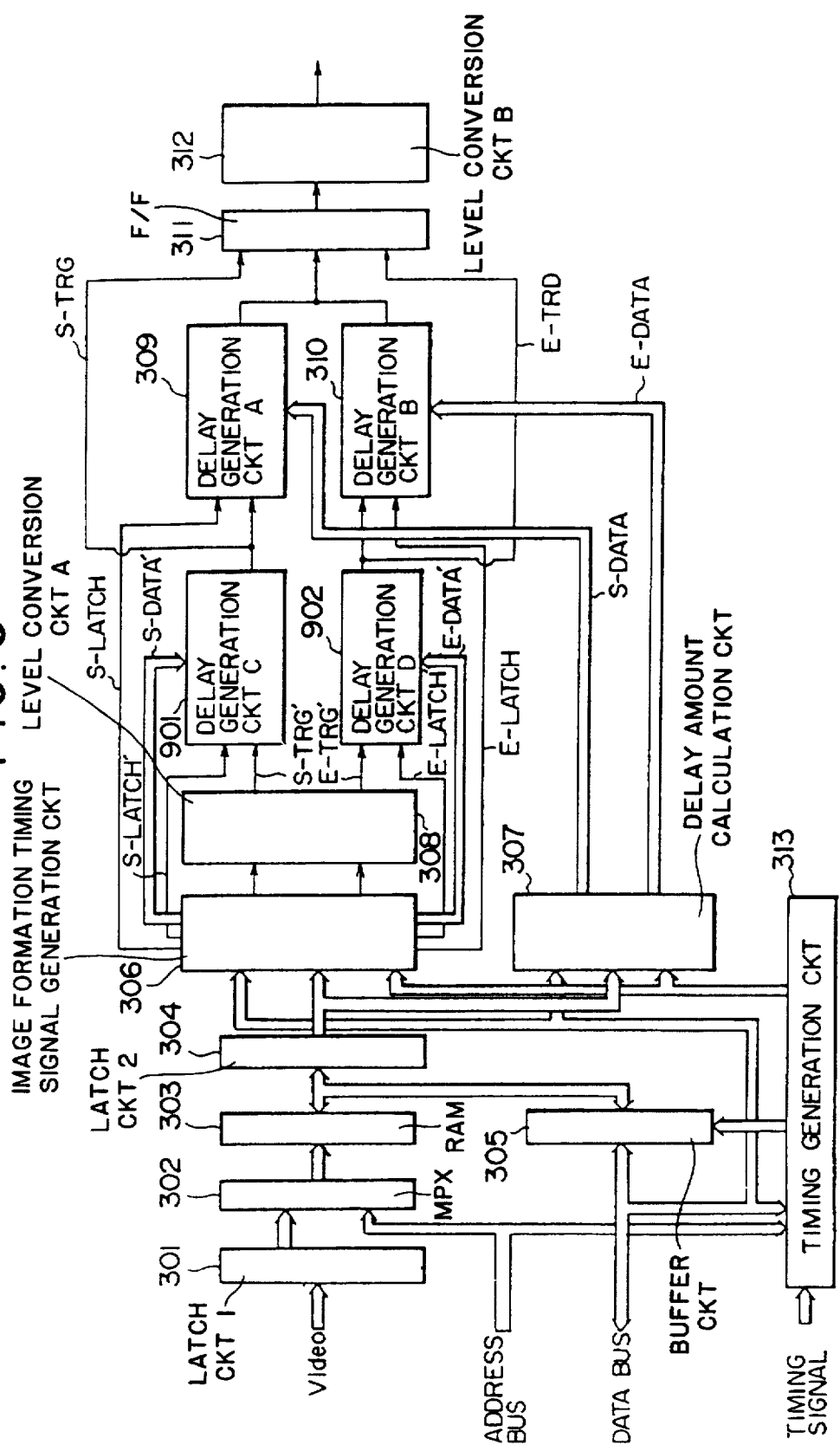

(3) FIG. 9 shows a modification of the first embodiment. This modification includes delay generation circuits C 901 and D 902 having the same arrangement as that of the delay generation circuits A 309 and B 310.

In the first embodiment, as shown in FIG. 1, one pixel is divided into eight portions in synchronism with the clock 8φ having a frequency eight times that of the clock φ for forming one pixel, thereby generating timing signals for forming a pixel.

Figure 10:
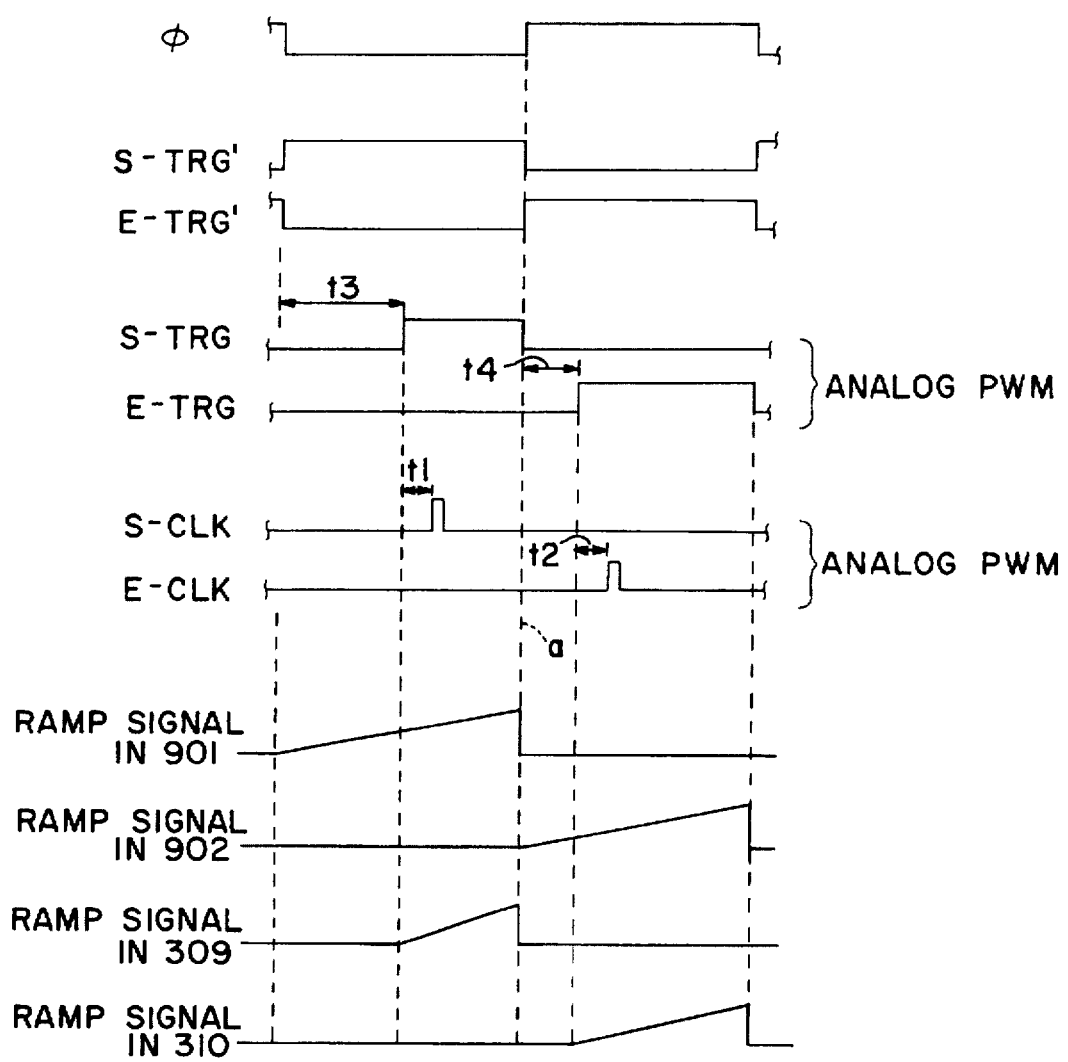
Figure 11:
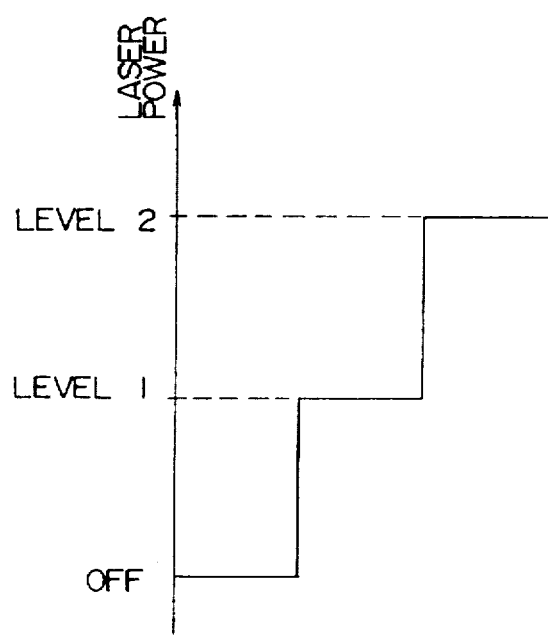

In the arrangement of FIGS. 9 and 10, since the delay generation circuits C 901 and D 902 are used, timing signals for forming a pixel are generated in synchronism with the clock φ for forming one pixel.

More specifically, referring to FIG. 10, in order to generate the signals S-TRG and E-TRG shown in FIG. 5, signals S-TRG' and E-TRG' synchronized with the clock φ are generated, and values S-DATA' and E-DATA' corresponding to delay times t3 and t4 from the signals S-TRG' and E-TRG' to the signals S-TRG and E-TRG are set in the delay generation circuits C (901) and D (902), respectively.

Note that signals S-LATCH' and E-LATCH' are generated at the same timings as those of the signals S-LATCH and E-LATCH, respectively.

(4) In the first and second embodiments, the laser is controlled in accordance with one-bit laser ON/OFF information. However, the laser power may be controlled by three values (i.e., OFF, level 1, and level 2).

Figure 12:
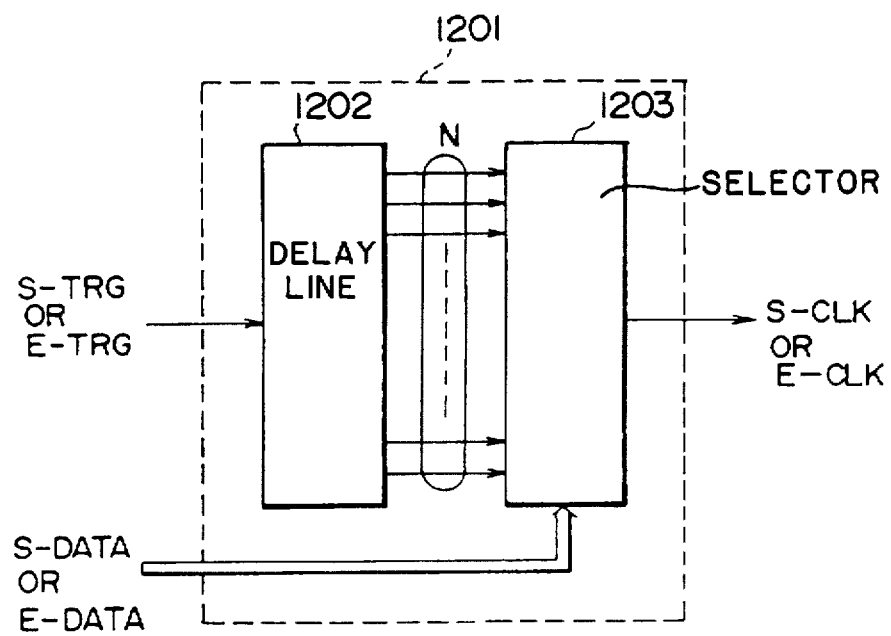

According to this method, if the delay generation circuits A 309 and B 310 are replaced with a delay circuit block 1201 arranged to select (a selector 1203) an output from a delay line 1202 constituted by an inductance of FIG. 12, each of M equal blocks constituting one pixel is divided into N blocks by the delay circuit blocks 1201, and the method is combined with the method for controlling the laser power by the three values, the gradation characteristic can be increased to some extent without largely increasing the value N.

(5) In the second embodiment, the pixel formation end timing signal is generated in every other pixel by using the delay generation circuits B 311' and C 312' due to the following reason.

The delay generation circuit used (e.g., the digital programmable delay circuit AD9500) comprises a ramp signal generator and a D/A converter (DAC). The ramp signal generator is operated in response to a trigger signal. When a ramp signal coincides with an output signal from the DAC, a delay signal is output. In the second embodiment, processing is performed in every other pixel in association with the settling time of the DAC.

Figure 16:
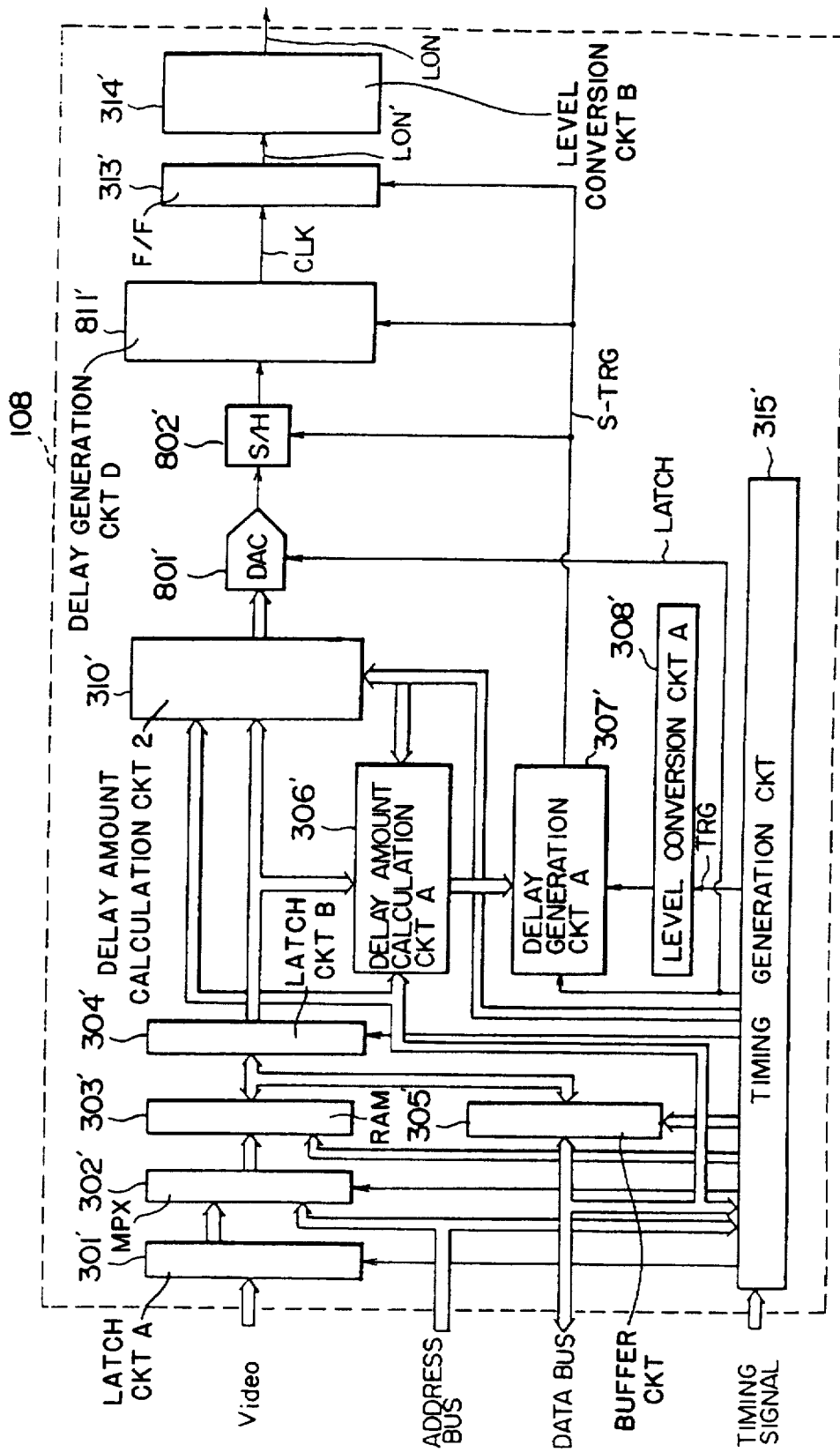
FIG. 16 is a block diagram showing a modification of the second embodiment of the image formation timing control block.

In an arrangement of FIG. 16, however, only one delay generation circuit for generating a pixel formation end timing signal is required.

Referring to FIG. 16, a DAC 801' receives an output from a delay amount calculation circuit 2 and converts it into an analog signal. A sample/hold circuit (S/H) 802' samples and holds the analog output from the DAC 801'.

The output of the S/H 802 is connected to an offset control terminal of a delay generation circuit D811' (e.g., AD9500), and the function of the internal DAC in the AD9500 is performed by the DAC 801' (in this case, the input to the internal DAC in the AD9500 is forcibly set to "0").

With the above arrangement, the output from the DAC 801' is sampled and held at a timing of the signal S-TRG. Even if the data in the DAC 801' is updated at a timing of the signal LATCH, the pixel formation end timing signal is output after a predetermined period of time. Note that a signal CLK in FIG. 16 is a pixel formation end timing signal output at the same timing as those of the signals CLK-A and CLK-B in FIG. 14.

[Still Another Embodiment]

An operation of still another embodiment of the image formation timing control block 108 having the above arrangement will be described with reference to FIGS. 17, 18, and 19.

Figure 18:
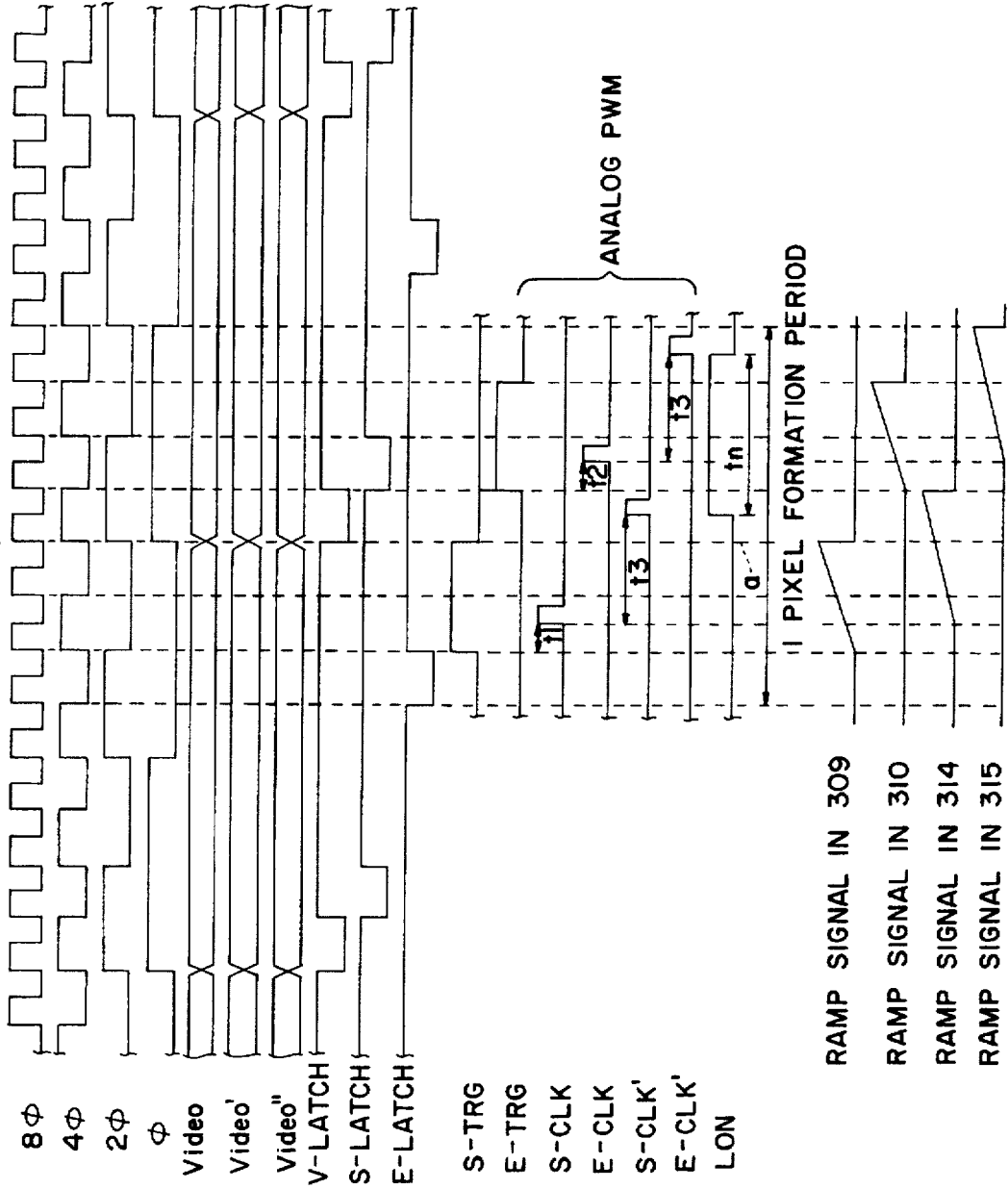
FIG. 18 is a timing chart showing an operation of the image formation timing control block shown in FIG. 17.

FIG. 18 is a timing chart showing an operation of an image formation timing control block 108. FIG. 19 is a timing chart showing output timings of signals S-TRG and E-TRG obtained by converting the level of an output signal from an image formation timing signal generation circuit 306 by a level conversion circuit 1 (308), and FIG. 6 is a graph showing γ conversion as in the first embodiment.

Figure 19:
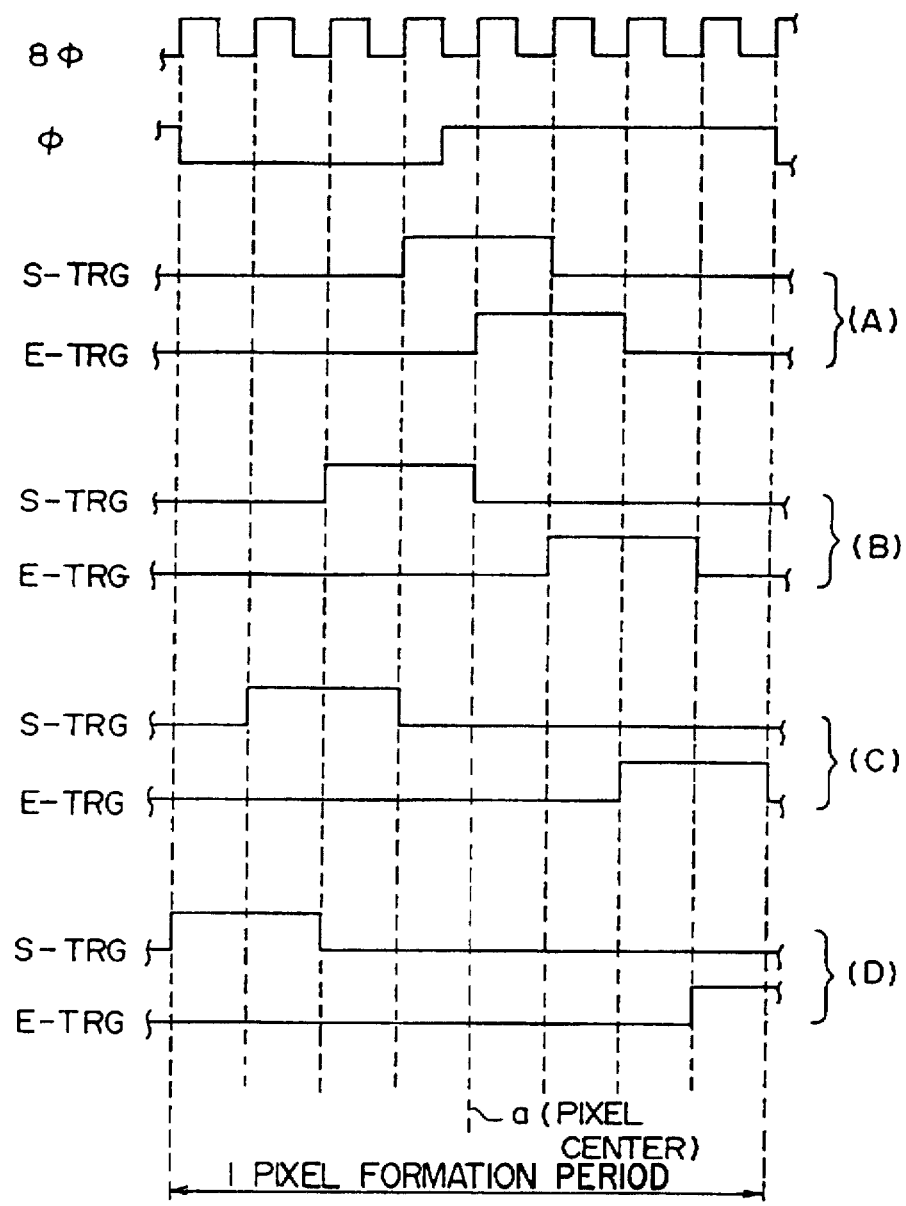
FIG. 19 is a timing chart of image formation timing signals corresponding to input image data values.

Referring to FIG. 19, a clock signal φ is a signal for forming one pixel, and a clock signal 8φ is a signal for dividing one pixel into eight portions with respect to a center a of pixel formation and has a frequency eight times that of the clock signal φ.

(A), (B), (C), and (D) show output timings of the signals S-TRG and E-TRG upon level conversion by means of the image formation timing signal generation circuit 306 in accordance with the values of the signal Video":

(A) when Video" is 0 to Ay;
(B) when Video" is Ay to By;
(C) when Video" is By to Cy; and
(D) when Video" is Cy to Dy.

The final pixel width is increased when the condition is changed in an order of (A) to (D). Since the pixel width obtained by the leading edge intervals of the signals S-TRG and E-TRG is determined, density correction of one pixel is performed in accordance with γ-conversion table parameters described above.

An image formation operation will be described with reference to mainly FIG. 4.

Digital image data Video sent from an image memory control block 103 is latched by the latch circuit 1 (301) at a leading edge of the clock signal φ, and a signal Video' is input to a RAM 303 as an address input (at this time, a MPX 302 selects an output from the latch circuit A 301).

The RAM 303 receives the signal Video' and outputs γ-converted data. This γ-converted data is latched (Video") by a latch circuit 2 (304) at a leading edge of the clock signal φ.

The image formation timing signal generation circuit 306 receives the signal Video" at a leading edge of a signal V-LATCH and generates the signals S-TRG and E-TRG at one of the timings (A), (B), (C), and (D) in FIG. 19 in accordance with the value of the signal Video" (in the operation of FIG. 18, the timing is (B)).

A delay amount calculation circuit 307 receives the signal Video" at the leading edge of the signal V-LATCH and calculates delay time amounts S-DATA and E-DATA from the signals S-TRG and E-TRG generated by the image formation timing signal generator 306 in accordance with the value of the signal Video" (in the case of FIG. 18, these delay time amounts are t1 and t2). The values corresponding to t1 and t2, i.e., S-DATA and E-DATA, are input to a delay generation circuit 1 (309) and the delay generation circuit 2 (310) in accordance with signals S-LATCH and E-LATCH output from a timing generation circuit 313 (note that the signals S-LATCH, E-LATCH, S-DATA, and E-DATA are TTL-level signals, and the signals S-TRG and E-TRG are ECL-level signals).

The delay amount calculation circuit 307 comprises, e.g., a RAM, and its delay time amount may be obtained by table conversion processing and set by a CPU 105. Alternatively, the RAM 303 may have a table conversion processing function, and a value corresponding to t1 or t2 is output from the RAM 303 by utilizing condition t1+t2=t (where t is a period of a divided block). The readout value is supplied to the delay amount calculation circuit 307, and the other value may be calculated.

The delay generation circuit 1 (309) and the delay generation circuit 2 (310) start counting in response to the signals S-TRG and E-TRG as trigger signals, and generate pulse signals S-CLK and E-CLK upon counting of the times t1 and t2, respectively. Note that the circuit 1 (309) and the circuit 2 (310) may comprise the AD9500s described above.

A delay generation circuit 3 (314) and a delay generation circuit 4 (315) receive the signals S-CLK and E-CLK as trigger signals, calculate a delay time (i.e., D-DATA or t3 in FIG. 18) set by a delay amount setting circuit 316, and generate signals S-CLK' and E-CLK', respectively.

The value set in the delay amount setting circuit 316 is sequentially set in synchronism with a signal BD as a sub-scan sync signal from the CPU 105 on the basis of a command from a host computer 101.

The signal D-DATA defining a delay time t3 is received by the delay generation circuit 3 (314) and the delay generation circuit 4 (315) in response to the signal D-LATCH before image formation in the main-scan direction becomes valid. A possible delay time is a maximum of a one-pixel period. In this embodiment, the delay time amount can be set in units of 256 divisions constituting the one-pixel period.

A flip-flop 311 receives the signals S-CLK' and E-CLK' and generates a signal LON' having a time width tw in FIG. 18 (i.e., a density signal corresponding to a point P in FIG. 6). The signal LON' is converted from the ECL level to the TTL level (LON signal), and the TTL-level signal LON drives a laser driver (not shown), thereby controlling the density of an image formed during an ON period of the laser driver.

In the above description, the image data transmission rate in sequential processing is set to be higher than an image formation rate of an image formation apparatus 102. The present invention, however, is not limited to this embodiment, and various changes and modifications may be made as needed. The present invention is also applicable to the embodiment described with reference to FIGS. 7 and 8.

[Still Another Embodiment]

In the embodiment described with reference to FIGS. 17 to 19, the image formation end timing signal is generated in every other pixel by using the delay generation circuit 1 (308) and the delay generation circuit 2 (309).

In this embodiment of the image formation apparatus, each delay generation circuit described above comprises a commercially available delay generation circuit generator (e.g., AD9500). The AD9500 includes a ramp signal generator and a D/A converter. The ramp signal generator is operated in response to a trigger signal. When the ramp signal coincides with an output signal from the DAC, a delay signal is generated. With this arrangement, processing is performed in every other pixel due to the settling time of the DAC.

The present invention is not limited to this arrangement. By using an arrangement shown in FIG. 20, only a single delay generation circuit for generating a pixel formation end timing signal can be realized.

An embodiment having the above arrangement will be described with reference to FIG. 20.

Figure 17:
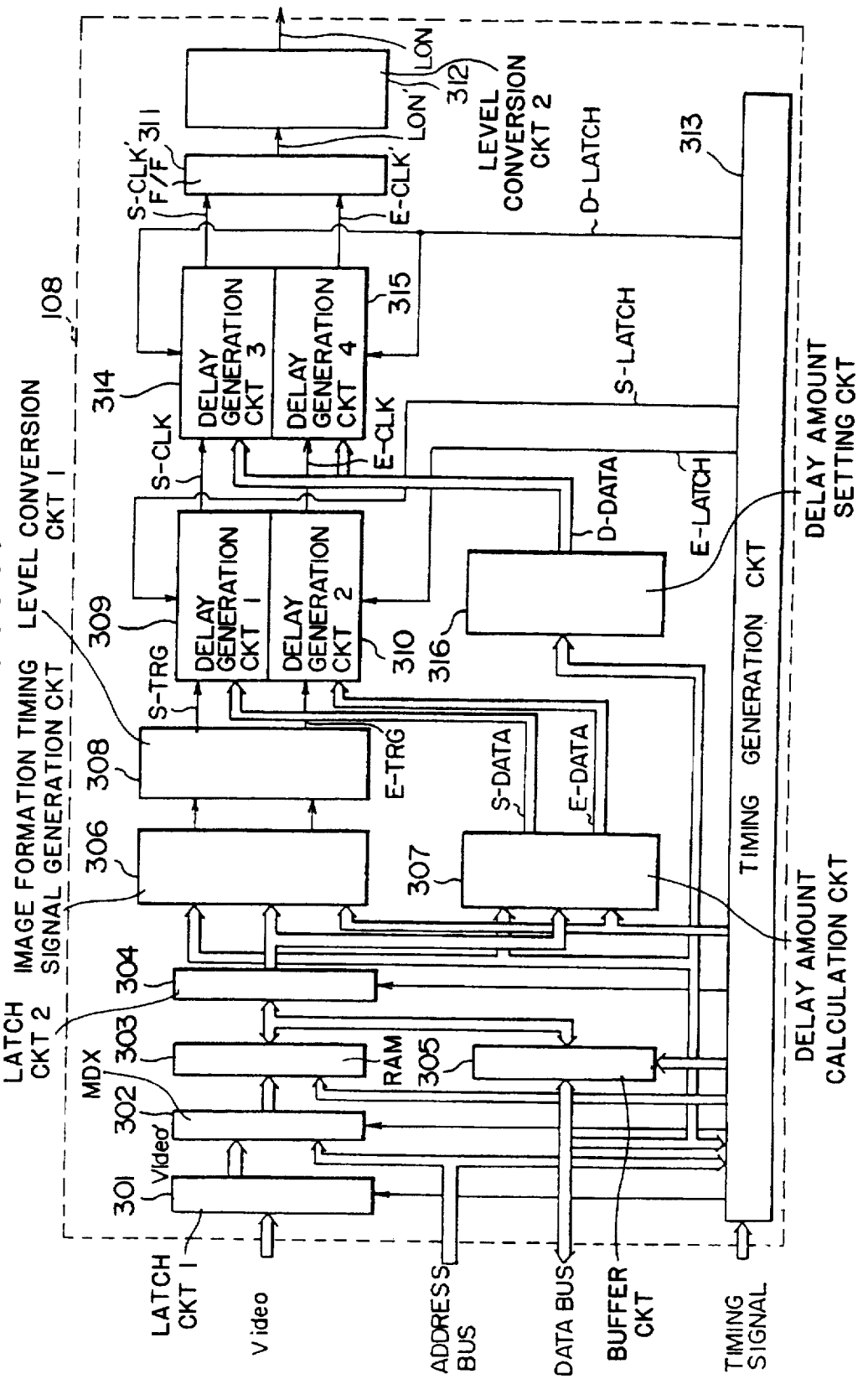
FIG. 17 is a block diagram showing a detailed arrangement of still another embodiment of the image formation timing control block.
Figure 20:
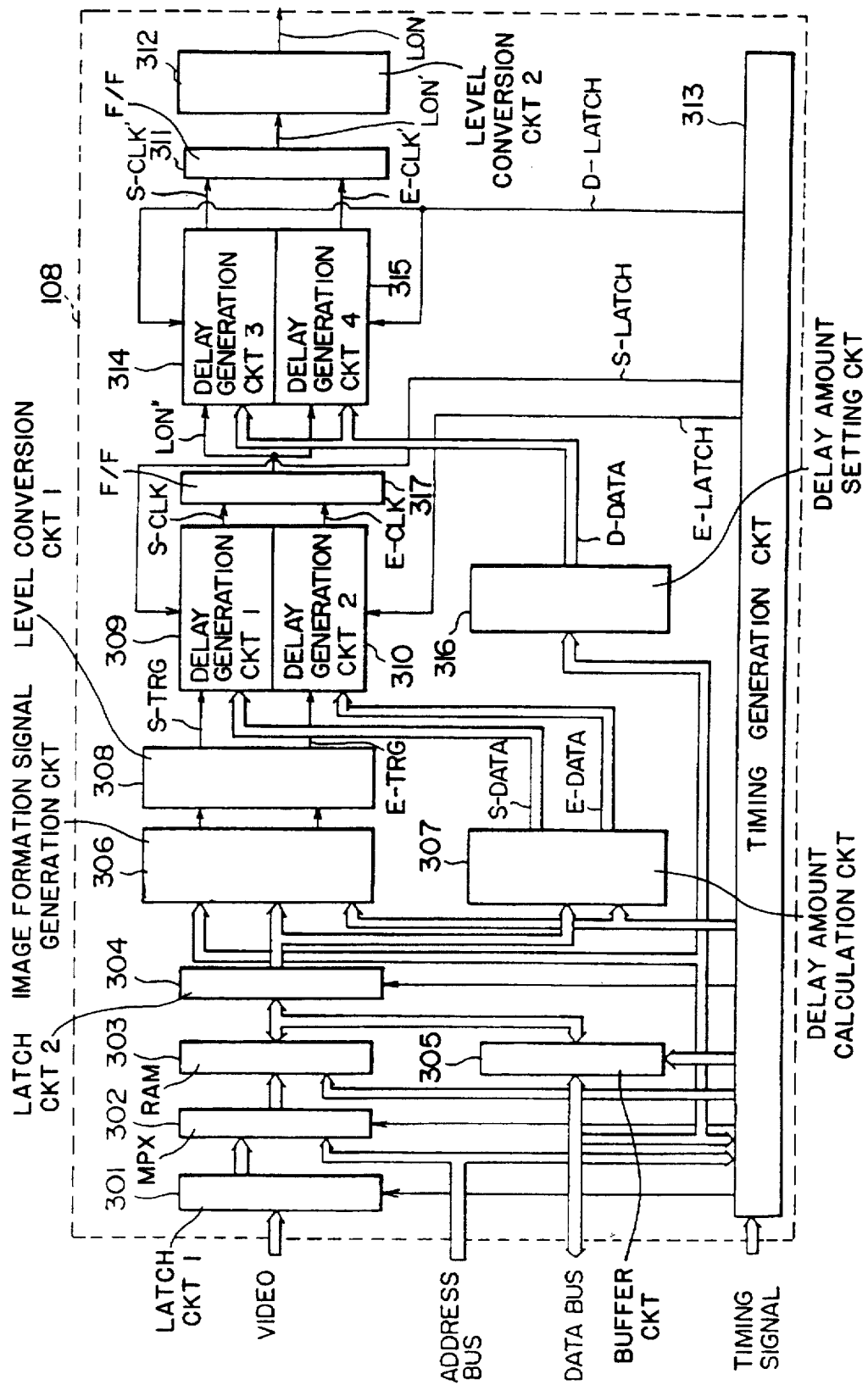
FIG. 20 is a block diagram showing a detailed arrangement of still another embodiment of the image formation timing control block.

The same reference numerals as in FIG. 17 denote the same parts in FIG. 20, and a detailed description thereof will be omitted.

An arrangement in FIG. 20 includes a flip-flop 317.

In the arrangement of FIG. 20, an output signal from the flip-flop 317 is controlled in response to clock signals S-CLK and E-CLK, and a pulse signal having a width tw in FIG. 4 is temporarily generated (i.e., a signal LON"). A delay generation circuit 3 is started at the leading edge of the signal LON" to generate a signal S-CLK'. A delay generation circuit 4 is started at the trailing edge of the signal LON" to generate a signal E-CLK'. An output signal from a flip-flop 311 is controlled in response to the signals S-CLK' and E-CLK'. A signal LON' is output upon a lapse of a predetermined period of time (t3), as shown in FIG. 18.

If the delay generation circuits 3 and 4 comprise AD9500s, respectively, since their trigger inputs are ECL-level differential inputs, the signals LON" are respectively input to the positive and negative inputs of delay generation circuits 3 (314) and 4 (315), thereby starting the delay generation circuits 3 and 4 at the leading and trailing edges of the signal LON".

In each embodiment described above, the laser is controlled in accordance with one-bit information for turning on/off the laser. However, the method of controlling a laser power with three values, as described with reference to FIG. 11 may be used.

The present invention may be applied to a system comprising a plurality of equipment or to an apparatus consisting of one equipment. The present invention can also be achieved by applying programs to a system or apparatus, as a matter of course.

In each embodiment described above, by using the digital programmable delay circuit, the following effects are obtained:

(1) the ON/OFF time of the laser can be controlled without performing offset and gain adjustment operations unique to an analog circuit, thereby expressing a halftone image;

(2) a halftone image can be expressed without greatly increasing an operating frequency of the circuit and greatly decreasing the number of lines to be reproduced (resolution);

(3) since γ-conversion processing is variable, density correction of the image formation apparatus can be controlled by the host computer; and (4) since the pixel formation start timing and the pixel formation end timing during sub-scanning can be controlled, a halftone expression can be performed with some screen angle, so that an image which has a minimum moiré can be obtained because an arbitrary screen angle can be set for the respective colors, i.e., yellow, magenta, cyan, and black, in a full-color printer.

The present invention is not limited to an electrophotographic laser beam printer, but can be applied to other image formation apparatuses capable of performing pulse width modulation.

The present invention may be applied to a system comprising a plurality of equipment or to an apparatus consisting of one equipment. The present invention can also be achieved by applying programs to a system or apparatus, as a matter of course.

[Still Another Embodiment]

Figure 21:
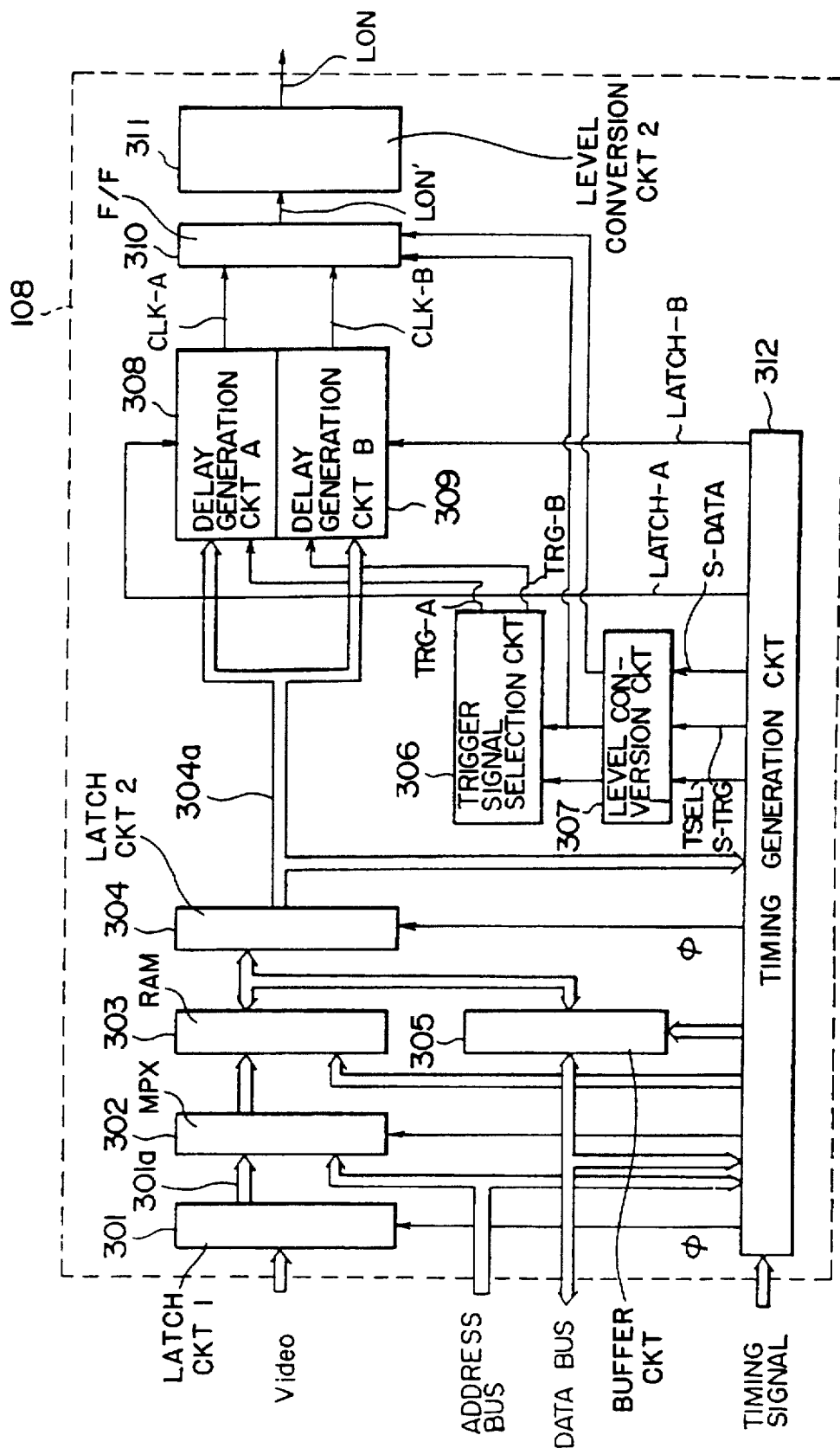
FIG. 21 is a block diagram showing a detailed arrangement of still another embodiment of the image formation timing control block of the image formation apparatus shown in FIG. 1.

A detailed arrangement of an image formation timing control block 108 of the image formation apparatus 102 shown in FIG. 1 is shown in FIG. 21.

The image formation timing control block 108 includes a latch circuit 1 (301) (an output from the latch circuit 1 is 301a), a RAM 303, a multiplexer (MPX) 302, a buffer circuit 305, and a latch circuit 2 (304) (an output from the latch circuit 2 is 304a). The latch circuit 1 (301) latches digital image data (Video) transmitted from an image memory control block 103. The RAM 303 stores a table for performing γ conversion. The MPX 302 switches address information applied to the RAM 303 when a CPU 105 sets γ conversion data in the RAM 303 and when the CPU 105 selects γ conversion data in accordance with the value of the signal 301a. The buffer circuit 305 performs electrical connection/disconnection between the data bus of the CPU 105 and the input/output bus of the RAM 303. The latch circuit 2 (304) latches data output from the γ conversion RAM 303 during image formation.

The image formation timing control block 108 also includes a level conversion circuit 307, a trigger signal selection circuit 306, a delay generation circuit A 308, a delay generation circuit B 309, a flip-flop 310, a level conversion circuit 2 (311), and a timing generation circuit 312. The level conversion circuit 307 converts a TTL-level signal into an ECL-level signal. The trigger signal selection circuit 306 receives a signal S-TRG representing the start of pixel formation and selects to which of the delay generation circuit A 308 and the delay generation circuit B 309 a trigger signal is to be applied (a signal TRG-A is applied to the delay generation circuit A, and a signal TRG-B is applied to the delay generation circuit B).

The delay generation circuit A 308 and the delay generation circuit B 309 receive an output from the latch circuit 2 (304) and generate clock signals CLK-A and CLK-B, respectively.

The flip-flop 310 receives a signal S-DATA for setting its output to "1" or "0" level when the signals S-TRG, CLK-A and CLK-B are enabled. The flip-flop 310 then generates a signal having a pulse width corresponding to a predetermined density. The level conversion circuit 2 (311) converts an ECL-level signal into a TTL-level signal.

The timing generation circuit 312 generates an operation timing of the image formation timing control block 108.

An operation of the image formation timing control circuit 108 having the above arrangement will be described with reference to a timing chart in FIG. 22.

Figure 22:
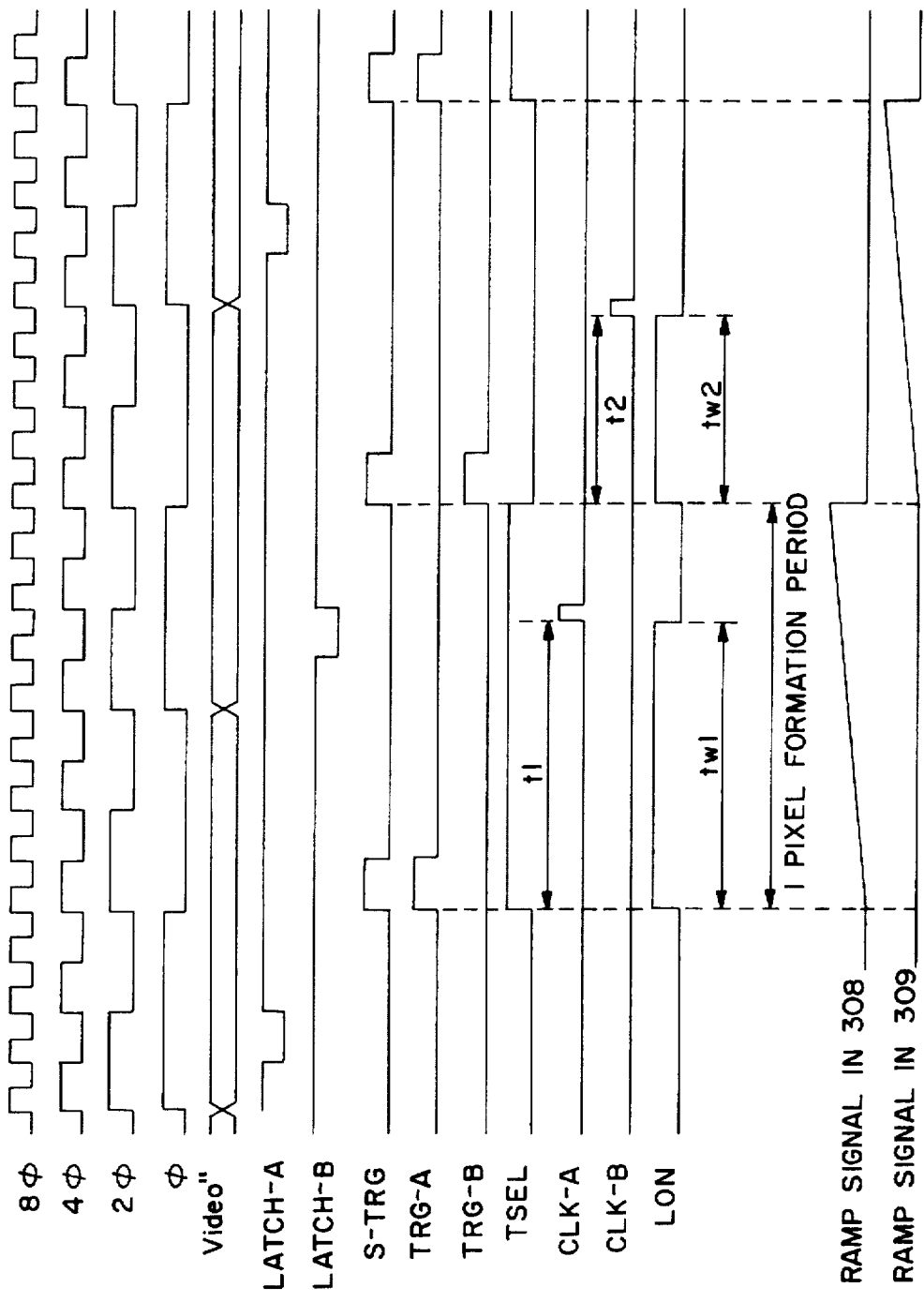
FIG. 22 is a timing chart showing an operation of the image formation timing control block shown in FIG. 21.

FIG. 22 is the timing chart showing an operation of the image formation timing control block 108.

Digital image data (a signal Video) transmitted from the image memory control block 103 is latched by the latch circuit 1 (301) at the leading edge of a clock φ for forming one pixel, and an output from the latch circuit 1 (301) serves as the signal 301a input to the address input of the RAM 303. The RAM 303 outputs γ conversion table data (γ-converted data) having the signal 301a as address data.

The γ-converted output data is latched (304a) by the latch circuit 2 (304) at the leading edge of the clock φ.

Thereafter, the output signal 304a from the latch circuit 2 is latched by the delay generation circuit A (308) and the delay generation circuit B (309) in response to latch signals LATCH-A and LATCH-B.

The signals TRG-A and TRG-B from the trigger signal selection circuit 306 are applied to the delay generation circuit A 308 and the delay generation circuit B 309 every other pixel in response to a signal TSEL synchronized with the signal S-TRG.

The delay generation circuit A 308 and the delay generation circuit B 309 generate signals CLK-A and CLK-B with lapses of predetermined delay times t1 and t2 from the signals TRG-A and TRG-B, respectively.

The delay times t1 and t2 are determined in accordance with the values of the signals 304a latched by the delay generation circuits A 308 and B 309, respectively, and serve as references for one-pixel drive time of the laser.

The flip-flop 310 is set to generate an output of "0" in the all white state of the image data in accordance with the signal S-DATA at a timing when the signal S-TRG is generated. Otherwise, the output from the flip-flop 310 is set at "1" in a state except for the all white state. Thereafter, the flip-flop receives the signals CLK-A and CLK-B and generates a signal LON' having a predetermined pulse width (tw1 or tw2) corresponding to the predetermined density, as shown in FIG. 22. The signal LON' is ECL/TTL-converted into a signal LON. The signal LON drives a laser driver (not shown).

The pixel is PWM-modulated in accordance with the length of pixel emission time (tw1 or tw2) during the one-pixel formation period. As a result, the density of one pixel to be formed is controlled by the length of time during which the laser driver is driven.

In summary, in accordance with the signal Video, correction data is extracted from the γ correction conversion table prepared in the RAM 303, and control of the delay generation time is performed by this correction data, thereby modulating one-pixel generation time. In addition, the contents of the γ correction conversion table are updated by the CPU 105.

In the above description, the image data transmission rate in sequential processing is set to be higher than the image formation rate of the image formation apparatus 102. The present invention is not limited to the embodiment described above. Various changes and modifications may be made as needed. The present invention is applicable to the system described with reference to FIGS. 7 and 8.

[Still Another Embodiment]

In the embodiment described with reference to FIGS. 21 and 22, the pixel formation end timing signals are generated in every other pixel by using the delay generation circuit A 308 and the delay generation circuit B 309.

In this embodiment of the image formation apparatus, each delay generation circuit described above comprises a commercially available delay generation circuit generator (e.g., AD9500). The AD9500 includes a ramp signal generator and a D/A converter. The ramp signal generator is operated in response to a trigger signal. When the ramp signal coincides with an output signal from the DAC, a delay signal is generated. With this arrangement of FIGS. 21 and 22, processing is performed in every other pixel due to the settling time of the DAC.

The present invention is not limited to this arrangement. By using an arrangement shown in FIG. 23, only a single delay generation circuit for generating a pixel formation end timing signal can be realized.

An embodiment having the above arrangement will be described with reference to FIG. 23.

Figure 23:
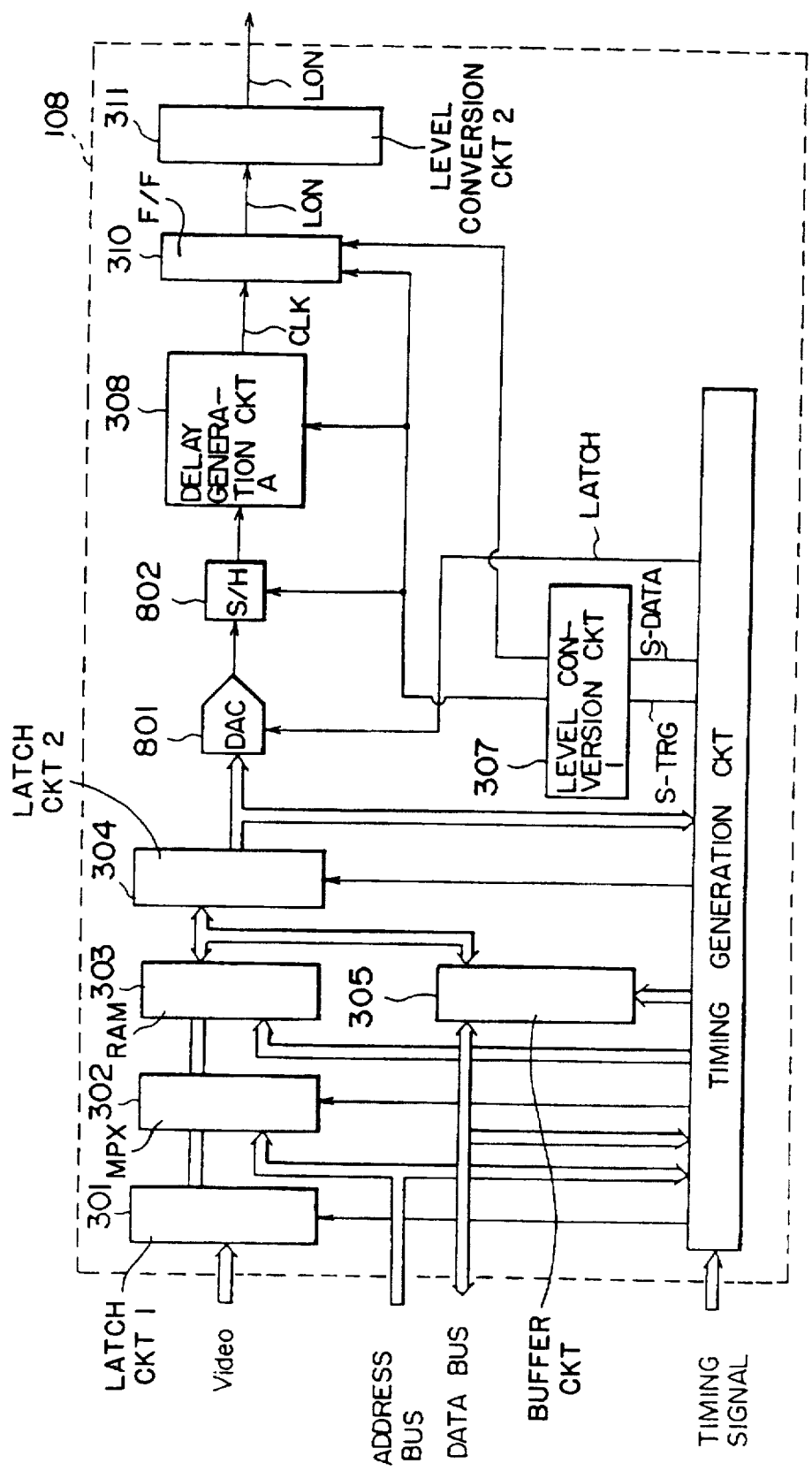
FIG. 23 is a block diagram showing a detailed arrangement of still another embodiment of the image formation timing control block.

The same reference numerals as in FIG. 21 denote the same parts in FIG. 23, and a detailed description thereof will be omitted.

An arrangement in FIG. 23 includes a DAC 801 for receiving an output from a latch circuit 2 and converting it into an analog signal, and a sample/hold circuit (S/H) 802 for sampling and holding an analog output from the DAC 801.

An output of the S/H 802 is connected to the offset adjustment terminal of a delay generation circuit A (308, e.g., an AD9500), and the internal DAC function of the AD9500 is substituted by the DAC 801 (at this time, the input to the internal DAC in the AD9500 is forcibly set at "0").

With the above arrangement, an output from the DAC 801 is sampled and held at a timing of a signal S-TRG. Even if the data of the DAC 801 is updated at a timing of a signal LATCH (i.e., a negative logic OR product of signals LATCH-A and LATCH-B in FIG. 22), a pixel formation end timing signal is output upon a lapse of a predetermined period of time (note that a signal CLK in FIG. 23 is a pixel formation end timing signal output at the same timings as those of the signals CLK-A and CLK-B in FIG. 4).

According to this embodiment, as described above, by using the digital programmable delay generating means, the following effects are obtained:

(1) the ON/OFF time of the laser can be controlled without performing offset and gain adjustment operations unique to an analog circuit, thereby expressing a halftone image;

(2) a halftone image can be expressed without greatly increasing an operating frequency of the circuit and greatly decreasing the number of lines to be reproduced (resolution); and (3) since γ-conversion processing is variable, density correction of the image formation apparatus can be controlled by the host computer.

According to the present invention, as has been described above, a halftone image can be expressed without requiring special adjustment operations and without decreasing the resolution for allowing satisfactory reproduction at a lower operating frequency.

In this case, an image which has a minimum moiré can be obtained because an arbitrary screen angle can be set for the respective colors, i.e., yellow, magenta, cyan, and black, in a full-color printer.

The present invention is not limited to the particular embodiments described above. Various changes and modifications may be made within the spirit and scope of the appended claims.

What is claimed is:

1. An image data processing apparatus, comprising:
   input means for inputting digital image data of a pixel;
   first means for obtaining a pixel formation start timing signal in accordance with the digital image data input by said input means;
   second means for obtaining a pixel formation end timing signal in accordance with the digital image data input by said input means; and
   third means, in communication with said first and second means, for obtaining a pixel formation signal from the pixel formation start and end timing signals in a pixel formation period, with the pixel formation signal being generated symmetrically with respect to a center of the pixel formation period, wherein
   said first and second means comprise digital delay circuits.

2. An apparatus according to claim 1, wherein said digital delay circuit of said second means is operated at a speed twice that of said digital delay circuit of said first means.

3. An image data processing apparatus, comprising:
   input means for inputting digital image data of a pixel;
   pixel dividing means for dividing one pixel to be formed into a plurality of blocks in accordance with a value of the digital image data input by said input means and generating a pixel division timing signal; and
   means, in communication with said pixel dividing means, for generating pixel formation start and end timing signals based on the pixel division timing signal generated by said pixel dividing means in a pixel formation period, with the pixel formation start and end timing signals generating a pixel formation signal symmetrically with respect to a center of the pixel formation period.

4. An apparatus according to claim 3, further comprising delay means for generating the pixel formation start and end timing signals for delaying the pixel division timing signal.

5. An apparatus according to claim 4, further comprising delay amount calculating means for calculating delay times of the pixel formation start and end timing signals from the pixel division timing signal based on the value of the digital input image data.

6. An apparatus according to claim 5, wherein the delay times generated by said delay amount calculating means are selectable.

7. An image formation apparatus, comprising:
   input means for inputting digital image data of a pixel;
   pixel dividing means for dividing one pixel into a plurality of blocks in accordance with a value of the digital image data input by said input means and for generating a pixel division timing signal;
   pixel start timing signal generating means, in communication with said pixel dividing means, for generating a pixel start timing signal based on the pixel division timing signal;
   pixel end timing signal generating means, in communication with said pixel dividing means, for generating a pixel end timing signal based on the pixel division timing signal;
   first delay means, in communication with said pixel start timing signal generating means, for generating a delay timing signal of a predetermined period of time based on the pixel start timing signal;
   second delay means, in communication with said pixel end timing signal generating means, for generating a delay timing signal of a predetermined period of time based on the pixel end timing signal;
   pixel generating means for generating an interval between the delay timing signals from said first and second delay means as a pixel signal in a pixel formation period, wherein the pixel signal is formed symmetrically with respect to a center of the pixel formation period; and
   forming means for forming an image based on the pixel signal generated by said pixel generating means.

8. An apparatus according to claim 7, wherein the pixel start and end timing signals are determined based on the density information of one pixel.

9. An apparatus according to claim 7, wherein said first and second delay means comprise means for independently setting the delay.

10. An image formation apparatus, comprising:

input means for inputting digital image data of a pixel;

timing signal generating means for generating a pixel formation start timing signal in accordance with the digital image data;

delay generating means for generating a pixel end timing signal upon a lapse of a predetermined period of time from the pixel formation start timing signal generated by said timing signal generating means based on the digital image data; and forming means for forming an image based on a pixel signal generated by the pixel formation start timing signal generated by said timing signal generating means and the pixel end timing signal generated by said delay generating means in a pixel formation period, wherein the pixel signal is formed symmetrically with respect to a center of the pixel formation period.

11. An apparatus according to claim 10, wherein said delay generating means comprises means for performing analog conversion of the image data and means for generating a ramp signal for generating the pixel end timing signal based on a trigger signal obtained from the pixel formation start timing signal.

12. An apparatus according to claim 1, wherein each of said first and second digital delay circuits comprises means for performing analog conversion of the image data and means for generating a ramp signal for obtaining time delay periods based on a trigger signal obtained from the input digital image data.

13. An apparatus according to claim 7, wherein each of said first and second digital delay circuits comprises means for performing analog conversion of gradation data and means for generating a ramp signal for obtaining delay timing signals based on a trigger signal obtained from the pixel timing signals.

14. An image data processing method, comprising the steps of:

inputting digital image data of a pixel;

obtaining a pixel formation start timing signal from the digital image data;

obtaining a pixel formation end timing signal from the digital image data;

obtaining a pixel formation signal from the pixel formation start and end timing signals in a pixel formation period, with the pixel formation signal being generated symmetrically with respect to a center of the pixel formation period; and providing digital delay circuits for obtaining the pixel formation start and end timing signals.

15. An image data processing method, comprising the steps of:

inputting digital image data of each pixel;

dividing one pixel to be formed into a plurality of blocks in accordance with a value of the digital image data;

generating a pixel division timing signal; and generating pixel formation start and end timing signals based on the pixel division timing signal in a pixel formation period, with the pixel formation start and end timing signals generating a pixel formation signal symmetrically with respect to a center of the pixel formation period.

16. An image formation method comprising the steps of:

inputting digital image data of each pixel;

dividing one pixel into a plurality of blocks in accordance with a value of the digital image data;

generating a pixel division timing signal;

generating a pixel start timing signal based on the pixel division timing signal;

generating a pixel end timing signal based on the pixel division timing signal;

generating a first delay timing signal of a predetermined period of time based on the pixel start timing signal;

generating a second delay timing signal of a predetermined period of time based on a pixel end timing signal;

generating an interval between the first delay timing signal and the second delay timing signal as a pixel signal in a pixel formation period, wherein the pixel signal is formed symmetrically with respect to a center of the pixel formation period; and forming an image based on the pixel signal.

17. An image formation method, comprising the steps of:

inputting digital image data of each pixel;

generating a pixel formation start timing signal based on the digital image data;

providing a delay generator, without a high-frequency clock, and generating a pixel end timing signal after a predetermined period of time from the pixel formation start timing signal based on the digital image data; and forming an image based on a pixel signal generated by the pixel formation start timing signal and the pixel end timing signal in a pixel formation period, wherein the pixel signal is formed symmetrically with respect to a center of the pixel formation period.

18. An image data processing apparatus, comprising:

input means for inputting digital image data of a pixel;

first means for obtaining a pixel formation start timing signal in accordance with the digital image data by said input means;

second means for obtaining a pixel formation end timing signal in accordance with the digital image data input by said input means; and third means, in communication with said first and second means, for obtaining a pixel formation signal from the pixel formation start and end timing signals in a pixel formation period, with the pixel formation start and end timing signals being adjustable.

19. An image data processing apparatus, comprising:

input means for inputting digital image data of a pixel;

pixel dividing means for dividing one pixel to be formed into a plurality of blocks in accordance with a value of the digital image data input by said input means and generating a pixel division timing signal; and means, in communication with said pixel dividing means, for generating pixel formation start and end timing signals based on the pixel division timing signal generated by said pixel dividing means in a pixel formation period, with the pixel formation start and end timing signals being adjustable.

20. An image data processing apparatus, comprising:

input means for inputting digital image data of a pixel;

timing signal generating means for generating a pixel formation start timing signal in accordance with the digital image data, the pixel formation start timing signal being adjustable;

delay generating means for generating a pixel end timing signal upon a lapse of a predetermined period of time from the pixel formation start timing signal generated by said timing signal generating means based on the digital image data; and forming means for forming an image based on a pixel signal generated by the pixel formation start timing signal generated by said timing signal generating means and the pixel end timing signal generated by said delay generating means in a pixel formation period.

* * * * *

UNITED STATES PATENT AND TRADEMARK OFFICE
CERTIFICATE OF CORRECTION

PATENT NO. : 5,754,303
DATED : May 19, 1998
INVENTOR(S) : Ito et al.

It is certified that error appears in the above-identified patent and that said Letters Patent is hereby corrected as shown below:

TITLE PAGE

[56] REFERENCES CITED:

FOREIGN PATENT DOCUMENTS, "1120115  5/1989  Japan" should read --1-120115  5/1989  Japan--.

COLUMN 17:

Line 2, "the" should be deleted.
Line 5, "delay." should read --delay timing signals.--.

Signed and Sealed this

Sixteenth Day of March, 1999

Attest:

Q. TODD DICKINSON

Attesting Officer

Acting Commissioner of Patents and Trademarks